United States Patent
Mohri et al.

(10) Patent No.: US 6,925,491 B2
(45) Date of Patent: Aug. 2, 2005

(54) FACILITATOR HAVING A DISTRIBUTED CONFIGURATION, A DUAL CELL APPARATUS USED FOR THE SAME, AND AN INTEGRATED CELL APPARATUS USED FOR THE SAME

(75) Inventors: Takao Mohri, Kawasaki (JP); Yuji Takada, Kawasaki (JP); Toshihiro Ide, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 838 days.

(21) Appl. No.: 09/785,994

(22) Filed: Feb. 16, 2001

(65) Prior Publication Data

US 2001/0051976 A1 Dec. 13, 2001

Related U.S. Application Data

(63) Continuation of application No. PCT/JP99/03463, filed on Jun. 28, 1999.

(30) Foreign Application Priority Data

Aug. 20, 1998 (JP) ............................................. 10-234760

(51) Int. Cl.⁷ ......................... G06F 15/16; G06F 15/173
(52) U.S. Cl. ..................................... 709/219; 709/238
(58) Field of Search ............................... 709/217–219, 709/238, 226, 227, 228; 707/3

(56) References Cited

U.S. PATENT DOCUMENTS

| | | | |
|---|---|---|---|
| 5,329,619 A | | 7/1994 | Page et al. |
| 5,341,477 A | | 8/1994 | Pitkin et al. |
| 6,108,646 A | | 8/2000 | Mohri et al. |
| 6,122,666 A | * | 9/2000 | Beurket et al. ............. 709/226 |
| 6,185,598 B1 | * | 2/2001 | Farber et al. ............... 709/226 |
| 6,330,561 B1 | * | 12/2001 | Cohen et al. ............. 707/104.1 |
| 6,377,991 B1 | * | 4/2002 | Smith et al. ............... 709/226 |
| 6,704,786 B1 | * | 3/2004 | Gupta et al. ................ 709/228 |

FOREIGN PATENT DOCUMENTS

| JP | 3-116262 | 5/1991 |
|---|---|---|
| JP | 10-240530 | 9/1998 |
| JP | 10-326284 | 12/1998 |

* cited by examiner

*Primary Examiner*—Patrice Winder
(74) *Attorney, Agent, or Firm*—Staas & Halsey LLP

(57) ABSTRACT

There is provided a facilitator having a flexible distributed configuration using cells with enhanced security.

The facilitator includes a query cell 20 for receiving a query from a user 60, a transfer cell 30 for transferring data to a predetermined cell, an answer cell 40 for organizing answers to the query from the user 60, and a dual cell 10 having two functions (function of the query cell and the function of the answer cell), wherein respective kinds of cells are organized based on a group 70, and the dual cell 10 is disposed on the border between the groups 70. All the data communicated between the groups 70 passes through the dual cell 10. The user 60 can see the answer cell portion of the dual cell 10, and the server 50 can see the query cell portion of the dual cell 10. Respective elements belonging to different groups are concealed from each other. The arrangement of each cell can be altered only by changing the setting of the dual cell 10.

7 Claims, 32 Drawing Sheets

FIG. 5

| Conditoin | Output Target |
|---|---|
| Condition 1 | Cell 1 |
| Condition 2 | Cell 2 |
| ⋮ | ⋮ |
| ⋮ | ⋮ |
| condition m | Cell m |

FACILITATOR HAVING A DISTRIBUTED CONFIGURATION, A DUAL CELL APPARATUS USED FOR THE SAME, AND AN INTEGRATED CELL APPARATUS USED FOR THE SAME

This application is a continuing application, filed under 35 U.S.C. §111(a), of International Application PCT/JP99/03463, filed Jun. 28, 1999, it being further noted that priority is based upon Japanese Patent Application 10-234760, filed Aug. 20, 1998.

TECHNICAL FIELD

The present invention relates to a facilitator that is disposed between a server apparatus and a client apparatus connected through a computer network and facilitates the server apparatus and the client apparatus so that they are concealed from each other, a dual cell apparatus used for the facilitator, and an integrated cell apparatus used for the facilitator.

BACKGROUND ART

Due to the development of the network such as the recent widespread use of the Internet, an environment is being created in which services on distributed computers can be accessed. In utilizing service, a user typically selects servers satisfying the user's purpose, and individually accesses them. However, in the environment where a number of kinds of services and a number of servers are preset, it is difficult for a user to select an appropriate server. It will also take time and trouble to access selected servers successively, if the number of servers is great. Furthermore, access methods are generally varied depending upon the server, so that the user is required to learn various server access procedures, which increases the burden on the user.

As a method for solving the above-mentioned problem, there is a method for placing a facilitating apparatus between a user (client) and a server. The facilitating apparatus is also called a facilitator. In the following description, the facilitating apparatus will be referred to as a facilitator. The facilitator receives access (query) from a client, selects and introduces servers that can satisfy the user's request, accesses the servers in place of the client, and organizes the obtained results to send them to the client. In this way, the facilitator has a plurality of kinds of functions, and the representative one is brokering. Brokering is a function of transferring a request from a user to selected servers, receiving answers from the servers, and organizing the answers to send them to the user.

In the case of using the above-mentioned facilitator, the client only needs to know the address of the facilitator, and is not required to know whereabouts of a plurality of servers. Furthermore, the facilitator accesses each server in place of the client, so that the variations in access methods are absorbed by the facilitator, and the client is not required to pay attention to them.

In the prior art, the facilitator is configured as a single unit. However, the use of such a facilitator of a centralized configuration type has the following problems.

The first problem is that a load is likely to be concentrated. Access from all the users or servers is concentrated on one facilitator, so that the processing of the facilitator is likely to cause a decrease in the performance of the entire system.

The second problem is that the flexibility of the system is decreased. All the processing is conducted by one facilitator; therefore, in the case where the information on a part of users or servers is altered, the setting of the facilitator is more frequently changed. If the setting of the facilitator cannot be dynamically changed, it is required to terminate the facilitator. However, if the facilitator is terminated, it will be impossible to use the entire system. Thus, it is expected that, with the centralized configuration, it will become impossible to use the entire system more frequently due to the changes in the setting.

The third problem is concerned with the management problem of the system caused by sharing. For example, in the case where information is shared among a plurality of companies, if a facilitator has a centralized configuration, one facilitator is shared by a plurality of companies. In this case, the following problems will arise: who will manage the facilitator and how the management cost will be allocated in the case of joint management.

The fourth problem is concerned with security. The facilitator is required to hold information about what kind of data is present at which server. Such data needs high security and is required to be strictly managed. In the case where the facilitator has a centralized configuration, data is collected at one place. Therefore, when a plurality of entities are facilitated, information on one management entity of the facilitator may be leaked to another management entity.

In order to solve the above-mentioned problems, it is known that the facilitator is configured so as to have a distributed configuration using a cell apparatus conducting distributed processes (hereinafter, referred to as "cell").

The facilitator having a distributed configuration will be described with reference to the drawings.

FIG. 32 illustrates a concept of the facilitator having a conventional distributed configuration. As shown in FIG. 32, a facilitator 500 is configured so as to have a distributed configuration using a plurality of cells, each autonomously conducting processing. The facilitator 500 includes three kinds of cells: a query cell 520, a transfer cell 530, and an answer cell 540. Each element in the figure is assigned an alphabetic number.

The query cell 520 has a function of authenticating a user, and receiving a request (query) from the user. The transfer cell 530 has a function of responding to an access request from one cell and transferring data to another appropriate cell. The answer cell 540 has an interface function with a server 550. These three kinds of cells are used respectively in a plurality of number, if required, distributed on the network, and operated in parallel. For example, when a request from a user 560 is sent to the server 550, each cell distributed on the network receives an access request from the user 560, compares it with its own condition equation, and transfers the request to a subsequent cell satisfying the condition. This operation is conducted by individual cells successively until the request from the user 560 reaches the server 550, whereby, as the entire facilitator, the server 550 satisfying the request of the user 560 is autonomously selected and the request of the user 560 is transmitted to the server 550.

According to the facilitator having a distributed configuration using a plurality of cells, the user 560 only needs to know the facilitator 500, and is not required to know the specific address of the server 550 and the information such as the kind of data owned by the server 550. Furthermore, a processing cost at a time of operation of the facilitator 500 is distributed to each cell, so that processing is not centralized and a bottleneck is unlikely to be caused. Furthermore, since the individual cells are processed autonomously, they can be managed by separate entities; if a facilitator is assigned to each company, the problems regarding security and allocation of a management cost can be solved. Furthermore, a plurality of access paths can be set, whereby robustness is enhanced. Furthermore, data globally dealt in the entire facilitator 500 does not exist, so that each cell can be corrected and altered independently, and maintained easily. Furthermore, a facilitator can be easily extended and altered by adding a new cell and changing a network configuration among cells.

However, the above-mentioned facilitator having a conventional distributed configuration can solve some problems of the facilitator having a conventional centralized configuration.

However, the facilitator having a conventional distributed configuration has the following problem regarding the security of a system.

The above-mentioned facilitator having a conventional distributed configuration has a flat configuration in which each cell has an independent and equal relationship. Therefore, any cells can directly communicate with each other since there is no particular limit to the communication therebetween. Thus, in an environment in which each cell has a flat relationship, a great amount of effort is required for maintaining the security of a system. If each cell for communication is reliable, the communication among the respective cells can be simplified in terms of management of a system. However, generally, in the case where the communication among a plurality of companies is required on a large-scale network, or in the case of an open network, it is not safe to trust all the cells. In such an environment, according to the facilitator having a conventional distributed configuration using flat cells, there is a possibility that all the cells directly communicate with each other, so that it is required to strictly check all the communication.

The above-mentioned problem is similar to that in the case where communication can be conducted directly by computers on the Internet. All the computers on the Internet can directly communicate with each other only by specifying a host; therefore, it is required to maintain the security of all the computers at a high level so that the problem of data leakage will not arise irrespective of how a computer is accessed by which computer. For this purpose, a system such as a firewall is often provided. The firewall limits or checks communication therethrough, thereby enhancing communication security. By strictly managing the firewall, unauthorized access to a computer in a company on the Internet can be prevented.

The above-mentioned facilitator having a conventional distributed configuration using flat cells correspond to the state having no firewall. In order to enhance the security of the facilitator, it is required to introduce a system corresponding to the firewall.

DISCLOSURE OF INVENTION

In view of the above-mentioned problems, it is an object of the present invention to provide a facilitator having a distributed configuration using cells, in which a system for enhancing security is introduced so as to enhance the security of the entire system without impairing the flexibility thereof, a dual cell apparatus used for the facilitator, and an integrated cell apparatus used for the facilitator.

In order to solve the above-mentioned problem, the facilitator having a distributed configuration of the present invention including cells for conducting distributed processes is disposed between a server apparatus and a client apparatus connected through a computer network, and facilitates the server apparatus and the client apparatus so that they are concealed from each other, wherein at least one of the cells of the facilitator is a dual cell that functions as a query cell for conducting a process of behaving as a querier making a request and as an answer cell for conducting a process of behaving as an answerer giving an answer to the request, and the dual cell has functions of two cells for behaving as a query cell with respect to the server apparatus to transfer contents of a request from a querier to the server apparatus and for behaving as an answer cell to the request with respect to the client apparatus to transfer an answer from the server apparatus to the client apparatus.

Because of the above-mentioned constitution, a user, a server, a query cell, an answer cell, and a transfer cell apparently communicate with a dual cell, and security can be enhanced compared with the case where each element cell included in the facilitator has a flat configuration.

Next, it is preferable that the cells of the facilitator are classified on a group basis to form a plurality of groups, the dual cell is disposed on a border between the groups, and communication between the groups is conducted through the dual cell.

Because of the above-mentioned constitution, a group of cells can be managed on the group basis, and the communication between the groups can be always conducted via a dual cell; therefore, security can be enhanced compared with the case where each element cell included in the facilitator has a flat configuration.

Next, it is preferable that the network includes a firewall, the server apparatus and the client apparatus are disposed across entities partitioned by the firewall, the dual cell is provided on the firewall, and the facilitator is configured across the firewall.

Because of the above-mentioned constitution, the facilitator having a distributed configuration of the present invention can be configured even on the network across entities partitioned by a firewall.

Next, it is preferable that, as a channel forming a data path, a plurality of dual cells are provided in parallel, whereby the plurality of channels, each forming the data path, are provided.

Because of the above-mentioned constitution, a load is prevented from being concentrated on one dual cell on a data path so as to distribute a load, and the processing ability of the facilitator from being decreased by an overload on a dual cell that is a connecting point on the network.

Next, it is preferable that the dual cell includes a temporary storing part for temporarily storing query contents and answer contents transmitted via the dual cell, and has a cache function of, in a case where the same query contents are repeated, omitting transmission of the query contents and providing answer contents corresponding to query contents stored in the temporary storing part.

Because of the above-mentioned constitution, in the case where the same query to the same server is repeated, a cache function of providing the stored contents while omitting communication to the server is realized in the facilitator, and a cost and a production time can be reduced in a system based on a wide area network.

Next, it is preferable that the dual cell includes an information rewriting part for rewriting information contents passing through the dual cell to send them, and the rewriting part holds information for converting an information format of one of the apparatuses communicating through the dual cell to an information format of the other apparatus, and converts an information format of input from the one apparatus communicating through the dual cell to an information format of the other apparatus to send it to the other apparatus.

Because of the above-mentioned constitution, even in the case where a user using a facilitator, a registered user name adopted by a group managing a server and the like are varied, and even in the case where a data format of communication contents (e.g., notation such as a nickname used by each entity and a date) is varied, a facilitator absorbing such a difference can be realized in an open network environment.

Next, it is preferable that two dual cells are disposed as a pair on a border between the groups of the cells so that a transfer direction as the querier is opposite to a transfer direction as the answerer, whereby bidirectional communication between the groups of the cells is made possible.

Because of the above-mentioned constitution, groups each including a user and a server are connected to each other, and service utilizing both the servers can be conducted in bidirectional communication.

Next, it is preferable that the above-mentioned facilitator includes at least three groups and a hub group for connection among the groups, wherein the hub group is connected to the respective groups via dual cells, and all the dual cells in the hub group are interconnected.

Because of the above-mentioned constitution, only by connecting the respective groups to the hub group via dual cells, the respective groups can access any server without being directly connected to the remaining groups individually, and a new group is added or an existing group is eliminated only by connection or disconnection with respect to the hub group. Therefore, a connection and management cost can be reduced.

Furthermore, the dual cell apparatus of the present invention is disposed between a server apparatus and a client apparatus connected through a computer network and facilitates the server apparatus and the client apparatus so that they are concealed from each other, wherein the dual cell apparatus functions as a query cell apparatus for conducting a process of behaving as a querier making a request and as an answer cell apparatus for conducting a process of behaving as an answerer giving an answer to the request, and the dual cell apparatus has functions of two cells for behaving as a query cell apparatus with respect to the server apparatus to transfer contents of a request from a querier to the server apparatus and for behaving as an answer cell apparatus to the request with respect to the client apparatus to transfer an answer from the server apparatus to the client apparatus.

Because of the above-mentioned constitution, a user, a server, a query cell, an answer cell, and a transfer cell apparently communicate with a dual cell apparatus, and security can be enhanced compared with a cell apparatus having a conventional flat configuration.

Furthermore, in order to solve the above-mentioned problem, in the facilitator having a distributed configuration of the present invention, at least one of the cells of the facilitator is an integrated cell that functions as a query cell for conducting a process of behaving as a querier making a request, as an answer cell for conducting a process of behaving as an answerer giving an answer to the request, and a transfer cell for conducting a process of behaving as a transferer that transfers contents received from another cell to a predetermined transfer target cell, and the integrated cell operates by selecting one of behavior as the single query cell, behavior as the single answer cell, behavior as the single transfer cell, and behavior as a dual cell having two functions of behaving as a query cell with respect to the server apparatus to transfer contents of a request from a querier to the server apparatus and for behaving as an answer cell to the request with respect to the client apparatus to transfer an answer from the server apparatus to the client apparatus, and the selected behavior can be changed.

Because of the above-mentioned configuration, as a cell of the facilitator, the operation mode of an integrated cell capable of conducting a plurality of functions is automatically altered in a dynamic manner in accordance with processing contents, whereby a use embodiment of the facilitator can be further flexible. Furthermore, the integrated cell is allowed to operate as a dual cell depending upon the user and the group to which a user belongs, whereby the security with respect to the user can be dynamically enhanced.

Furthermore, the integrated cell apparatus of the present invention functions as a query cell apparatus for conducting a process of behaving as a querier making a request, as an answer cell apparatus for conducting a process of behaving as an answerer giving an answer to the request, and a transfer cell apparatus for conducting a process of behaving as a transferer that transfers contents received from another cell apparatus to a predetermined transfer target cell apparatus, and the integrated cell apparatus operates by selecting one of behavior as the single query cell apparatus, behavior as the single answer cell apparatus, behavior as the single transfer cell apparatus, and behavior as a dual cell apparatus having two functions of behaving as a query cell apparatus with respect to the server apparatus to transfer contents of a request from a querier to the server apparatus and for behaving as an answer cell to the request with respect to the client apparatus to transfer an answer from the server apparatus to the client apparatus, and the selected behavior can be changed.

Because of the above-mentioned constitution, the operation mode of an integrated cell apparatus capable of conducting a plurality of functions is automatically altered in a dynamic manner in accordance with processing contents, whereby a further flexible use embodiment can be realized. Furthermore, the integrated cell is allowed to operate as a dual cell apparatus depending upon the user and the group to which a user belongs, whereby the security with respect to the user can be dynamically enhanced.

By describing and recording a processing program in a computer-readable recording medium so that the functions of the above-mentioned facilitator, dual cell, and integrated cell are realized, the facilitator, dual cell, and integrated cell of the present invention can be configured by using a variety of computer platforms.

BRIEF DESCRIPTION OF DRAWINGS

FIG. 5 is a diagram showing an exemplary condition table stored in each cell of the facilitator according to the present invention.

BEST MODE FOR CARRYING OUT THE INVENTION

Hereinafter, a facilitator having a distributed configuration of the present invention will be described by way of embodiments with reference to the drawings. Hereinafter, a cell refers to a process implemented on a computer and processed on a computer apparatus (cell apparatus), and a plurality of cells may be realized by virtually setting one computer apparatus as a plurality of cell apparatuses.

Embodiment 1

A facilitator having a distributed configuration of Embodiment 1 will be described, in which a group including user terminals is different from a group including servers, and the group including user terminals is connected to the group including servers via a dual cell.

The outline of the entire configuration of the facilitator having a distributed configuration of Embodiment 1 and the entire image of a processing flow of the facilitator will be described with reference to the drawings.

Figure 1:
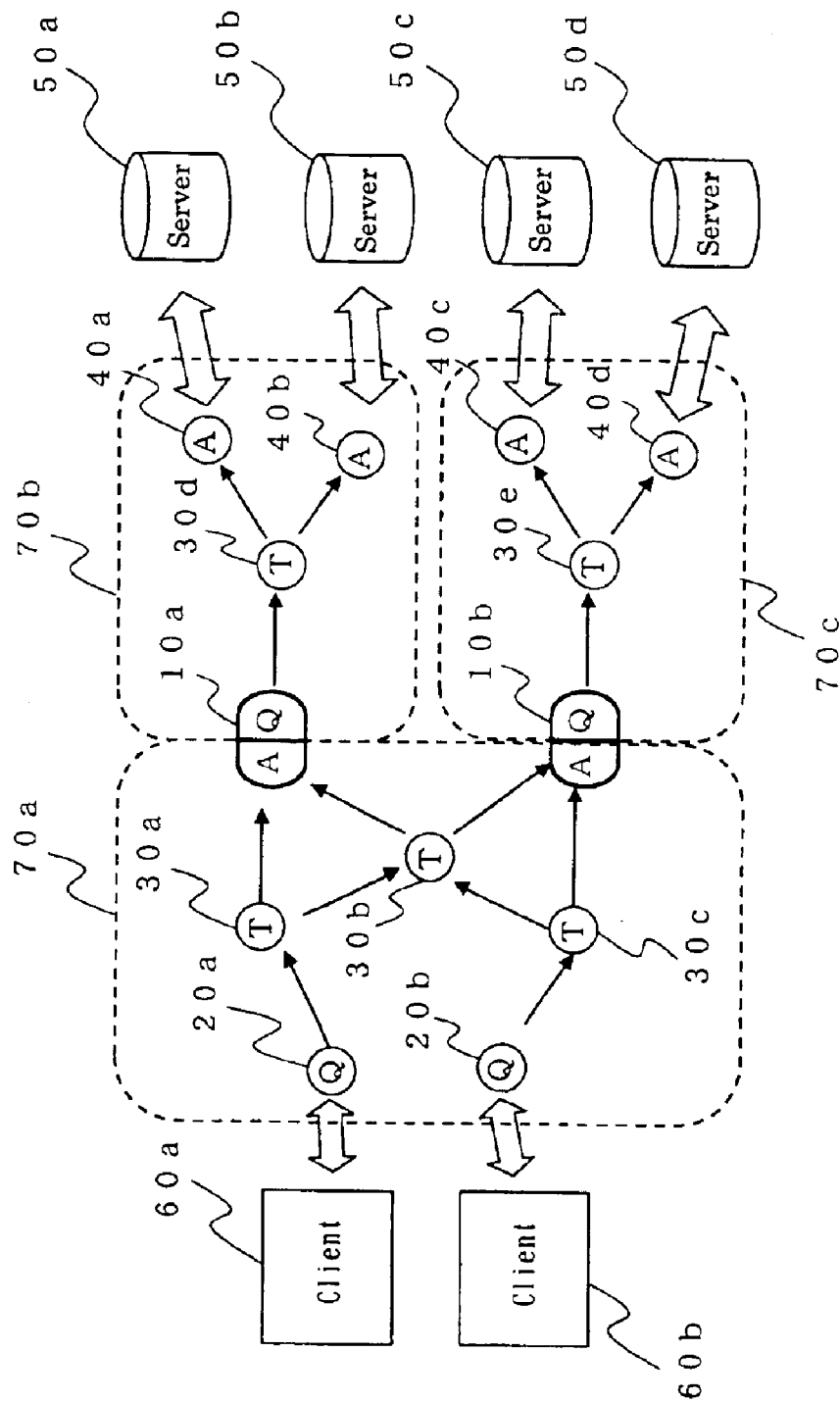
FIG. 1 is a schematic block diagram of a facilitator having a distributed configuration of Embodiment 1 according to the present invention.

FIG. 1 is a schematic block diagram of the facilitator having a distributed configuration of the present invention. As shown in FIG. 1, the facilitator having a distributed configuration of Embodiment 1 is roughly composed of a dual cell 10, a query cell 20, a transfer cell 30, an answer cell 40, a server 50, and a client 60. Each element in the figure is assigned an alphabetic number, and elements assigned the same alphabetic numbers have similar functions. In an exemplary configuration shown in FIG. 1, the facilitator is composed of dual cells 10a and 10b, query cells 20a and 20b, transfer cells 30a to 30e, answer cells 40a to 40d, servers 50a to 50d, and clients 60a and 60b. Furthermore, as for cells of the facilitator, a group 70a, a group 70b, and a group 70c having dual cells on their borders are defined. A symbol assigned to each cell in FIG. 1 represents the function of each cell simply. Q denotes a cell portion having the function of a query cell, T denotes a cell portion having the function of a transfer cell, and A denotes a cell portion having the function of an answer cell. Arrows connecting each cell in FIG. 1 represent a communication partner and a communication direction among the respective cells.

Prior to describing the entire image of processing of the facilitator having a distributed configuration of the present invention shown in FIG. 1, first, the function of each cell shown in FIG. 1 will be described, and thereafter, the entire image of processing of the facilitator having a distributed configuration using dual cells will be described.

Each cell will be described mainly regarding the dual cell 10, and the query cell 20, the transfer cell 30, and the answer cell 40 will also be described in detail.

First, the dual cell 10 will be described. The dual cell 10 is a special cell introduced into the present invention, and roughly has the following two features. The functions of the query cell 20 and the answer cell 40 in the following description will be described in detail in the later description of the query cell 20 and the answer cell 40.

The first feature of the dual cell 10 is to be positioned on the border of cell groups and to function as a connecting point of the communication among the groups. More specifically, the communication between the respective groups is always conducted via the dual cell 10. The dual cell 10 functions as a connecting point of the communication between groups, whereby unlike the conventional distributed configuration using cells having a flat and equal relationship in which the communication can be freely conducted among the respective cells, the facilitator of the present invention has a configuration divided into groups having the dual cell 10 on the borders, and the communication among the cells belonging to the same group can be directly conducted in a flat and equal manner, whereas the communication among the cells belonging to different groups is conducted via the dual cell 10.

The second feature is that the dual cell 10 has a cell portion having the function of the query cell 20 and a cell portion having the function of the answer cell 40. The dual cell 10 is shown in FIG. 1 so as to have a cell portion Q having the function of the query cell 20 and a cell portion A having the function of the answer cell 40. More specifically, the dual cell 10 looks as the answer cell 40 in the case of access from the user side. More specifically, it looks as the dual cell 10 receives a request from the user 60, and responds to the request to create an answer to the query. In contrast, on the server side, the dual cell 10 looks as a user who has first generated the query. The destination of the answer is also the dual cell 10. In the dual cell 10, the cell portion A on the user side functioning as the answer cell 40 receives a request, and the cell portion Q on the server side functioning as the query cell 20 transfers the query to the server 50. The answer to the query is sent back to the user 60 through the opposite path. Such a transition of a query and an answer can be realized by rewriting the names of a querier (user) and an answerer (server).

By introducing the dual cell 10 having the above-mentioned features, the facilitator having a distributed configuration of the present invention has the following advantages.

The first advantage of the introduction of the dual cell 10 is that the security and maintenance in a group by concealing can be enhanced. The dual cell 10 has an effect of grouping a plurality of cells and concealing the inside thereof. For example, in FIG. 1, due to the dual cell 10a, the cells (e.g., the query cell 20a) in the group 70a on the user side cannot know the presence of the cells (e.g., the answer cell 40a) in the groups 70b and 70c on the server side. Furthermore, as described later, due to the facilitating function of the dual cell 10, it is not required to directly know the presence of cells in another group. Similarly, due to the dual cells 10a and 10b, the cells (e.g., the answer cell 40a) in the groups 70b and 70c on the server side cannot know the presence of the cells (e.g., the query cell 20a) in the group 70a on the user side, and are not required to know it.

If the address of each cell is concealed as described above, even if a malicious person tries to communicate, he or she will not be able to communicate without knowing the address. Because of concealing of an address, the security of a system is enhanced. Furthermore, the address of each cell is not known externally, so that it is not required to externally announce the change of address of each cell, and the change of address can be handled only by changing the setting of the dual cell 10. Thus, the flexibility and maintenance of the system are also enhanced.

The second advantage of the introduction of the dual cell 10 is that a facilitator can be configured across the firewall. In the case of connecting a corporate network (intranet, etc.) to the Internet, the above-mentioned firewall is often provided. The situation in which a user and a server are separated in two networks with the firewall interposed therebetween can be assumed in the case where information is shared by companies (e.g., CALS). In order to facilitate the user 60 and the server 50 across the networks partitioned by the firewall, the networks only need to be connected to each other by operating the dual cell 10 on a firewall machine. Conventionally, in the case where companies cooperate with each other, the partition of networks by the firewall often hinders the implementation of a system. The facilitator having a distributed configuration using dual cells of the present invention can be operated even in the presence of the firewall, so that the importance of this technology is considered to be high.

The third advantage of the introduction of the dual cell 10 is that the contents of a query and an answer can be easily stored (cache function), and can be easily managed. In general, external connection entails a high cost, so that the repetition of connection and communication is not desired in terms of economy. If the contents of communication through the dual cell 10 are stored, in the case where the same query is repeated with respect to the same server 50, the communication to the server 50 is omitted, and the stored contents can be returned (cache function). It is expected that this cache function is effective in most cases in terms of a cost and a processing time.

The fourth advantage of the introduction of the dual cell 10 is that a user name can be converted in the dual cell 10. As for the access to the server 50, a user name is often used for controlling security. However, registration of individual user names in the server 50 requires enormous efforts, which is not considered to be efficient. Therefore, when the dual cell 10 converts a received communication user name to another user name having the same authority and transfers it, the server 50 is not required to newly register the user, and appropriate access control can be conducted. For example, the following method is made possible: two kinds of representative user names such as "Employee of Cooperative Company" and "Employee of other companies" for access from an outside are registered in the server 50, and a user name is converted to either one of the representative names for access from an outside and sent to a server.

The fifth advantage of the introduction of the dual cell 10 is that the contents of a query and an answer can be converted in the dual cell 10. A function of rewriting a query and an answer, as well as a function of rewriting the names of a querier and an answerer may also be useful in most cases. For example, in difference companies, the same matter may have different names, and a method for indicating a date may be varied. The dual cell 10 can absorb such a difference by rewriting the contents of a query and an answer.

The sixth advantage of the introduction of the dual cell 10 is that a load can be distributed by a plurality of dual cells 10. A load can be distributed by operating a plurality of dual cells 10 in parallel, if required.

By introducing the dual cell 10 as described above, the facilitator having a distributed configuration of Embodiment 1 according to the present invention can be configured.

Next, each function of the query cell 20, the answer cell 40, and the transfer cell 30 will be described. These three kinds of cells respectively have the following basic function and extended function in common. The basic function of a cell is to send a request to a predetermined cell in accordance with the conditions owned by the cell and obtain an answer to it. More specifically, each cell has a combination of the addresses of other cells and the conditions to be satisfied in the case of sending a request to the corresponding cell. Herein, a table describing the conditions and addresses are called a condition table. FIG. 5 shows an exemplary condition table. More specifically, when receiving a request from a user terminal or another cell (an entity sending a request is referred to as a request origin), each cell refers to its condition table as shown in Table 5, extracts all the addresses that satisfy the conditions shown in the condition table based on the contents of the given request, and distributes the request to the extracted addresses (a distribution target is referred to as a request target). Thereafter, each cell receives answers from the request targets, and sends them to the request origin. In addition to the above-mentioned basic function, the query cell 20 has a function of converting the contents of a request described in an external format inputted from the user 60 to an internal format processed by each cell, and a function of converting the contents of an answer described in an internal format obtained from another cell to a description of an external format in accordance with a user. Furthermore, the answer cell 40 is provided with a function of actually accessing the server 50.

Next, the respective features of the query cell 20, the transfer cell 30, and the answer cell 40 will be described separately.

Figure 6:
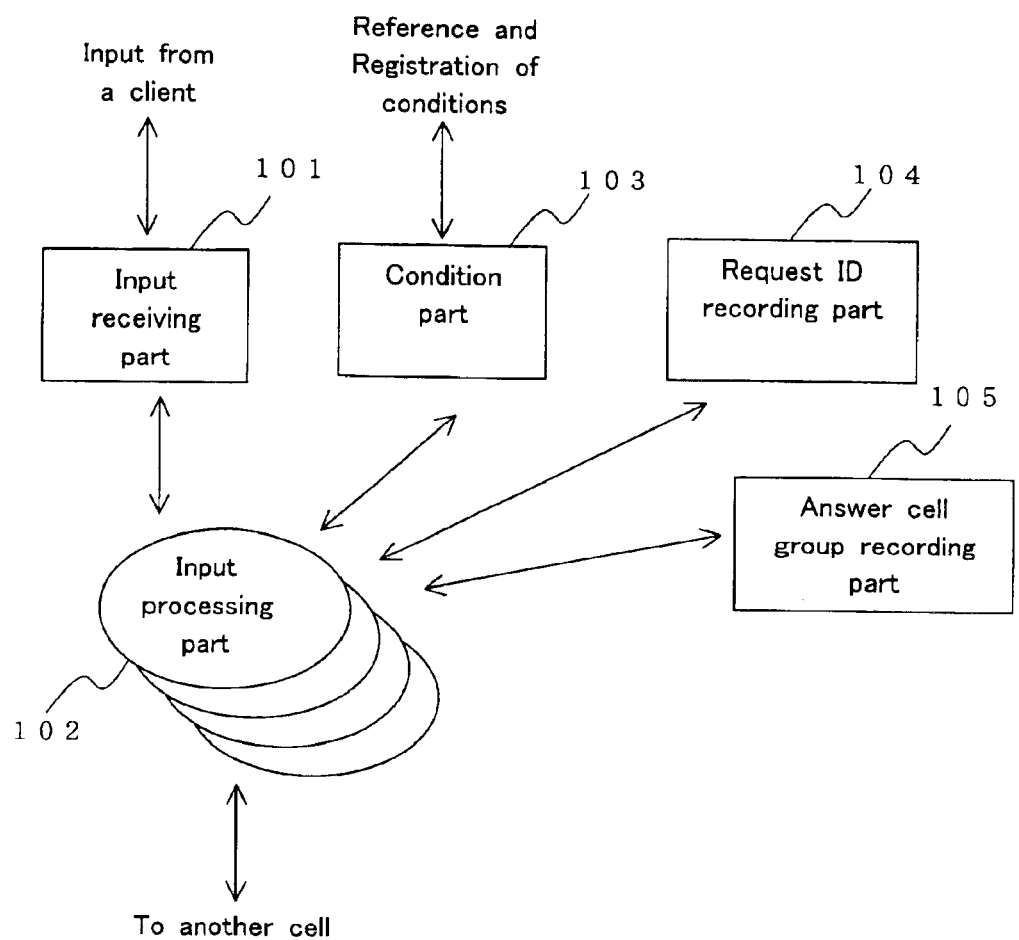
FIG. 6 is a diagram showing an exemplary module configuration of a query cell of the facilitator according to the present invention.

FIG. 6 shows an exemplary module configuration of the query cell 20. The query cell 20 is internally configured by a plurality of processes, and includes an input receiving part 101, an input processing part 102, a condition part 103, a request ID recording part 104, and an answer cell group recording part 105. Square parts represent resident processes, which continue to operate, while waiting for input from an outside, during a period from the start-up of the query cell 20 until a completion request is entered. The input processing part 102 surrounded by a circle is a dynamic process that is generated every time the input receiving part 101 receives input from an outside. Actual processing is conducted mainly while the input processing part 102 is communicating with another internal process or another cell. The reason for generating the input processing part 102 for each external input is to conduct parallel processing for each process, thereby rendering the processing efficient. More specifically, in the case where the input processing part 102 is configured by one process, the subsequent processing cannot be conducted unless one input processing is completed, which causes a response (turnaround time) of the facilitator seen from the user 60 to be slow. The above-mentioned generation of the input processing part 102 is intended to avoid this situation.

The outline of five kinds of processes of the query cell 20 are as follows.

Figure 7:
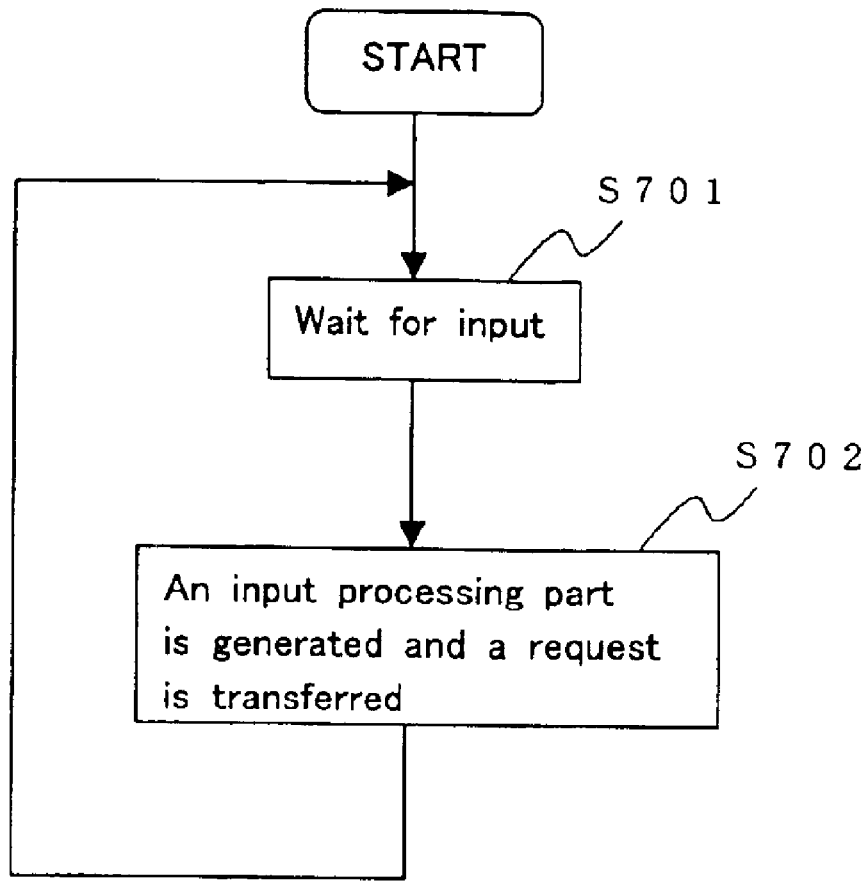
FIG. 7 is a flow chart showing, as processing steps, exemplary processing contents of an input receiving part 101 of the facilitator according to the present invention.

FIG. 7 is a flow chart showing, as processing steps, exemplary contents of processing of the input receiving part 101. Upon receiving input while waiting for input (Step S701), the input receiving part 101 checks the contents of a request, and generates and activates the input processing part 102 to ask for processing of the request (Step S702).

Figure 8:
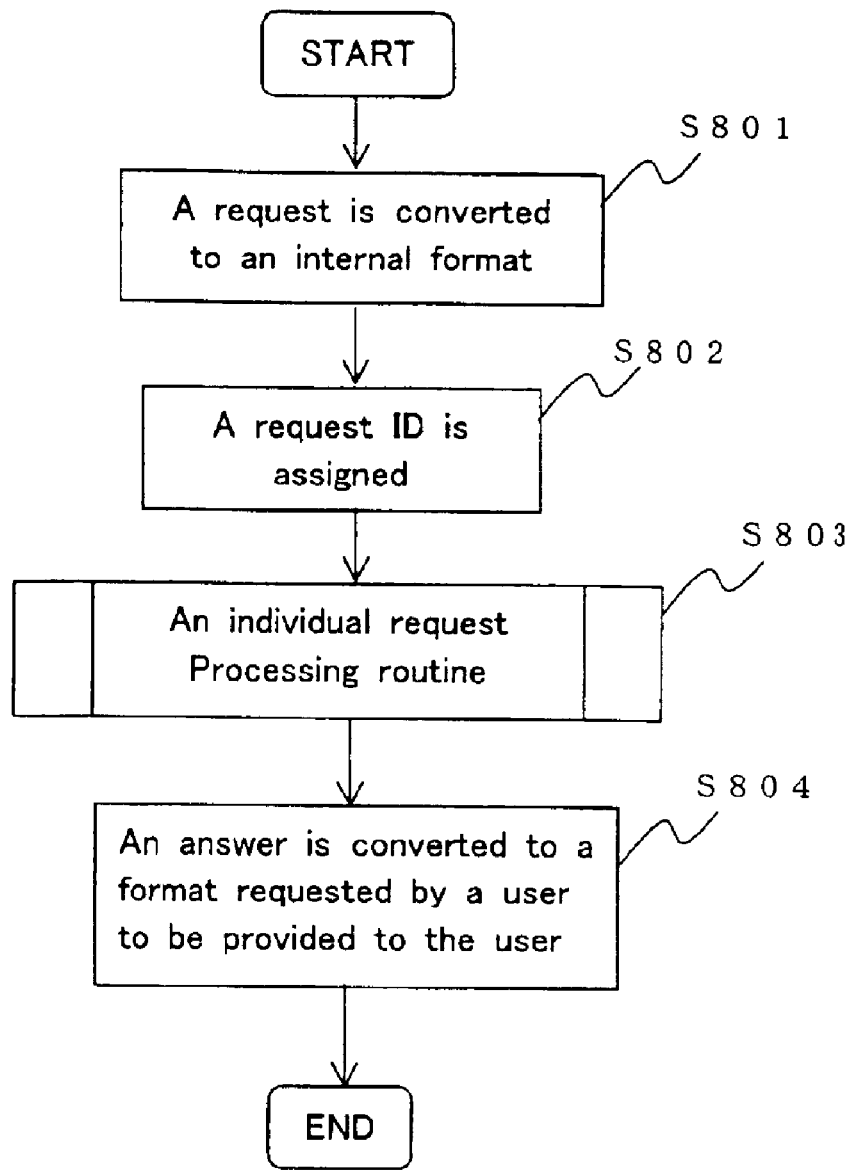
FIG. 8 is a flow chart showing, as processing steps, exemplary processing contents of an input processing part 102 of the facilitator according to the present invention.
Figure 9:
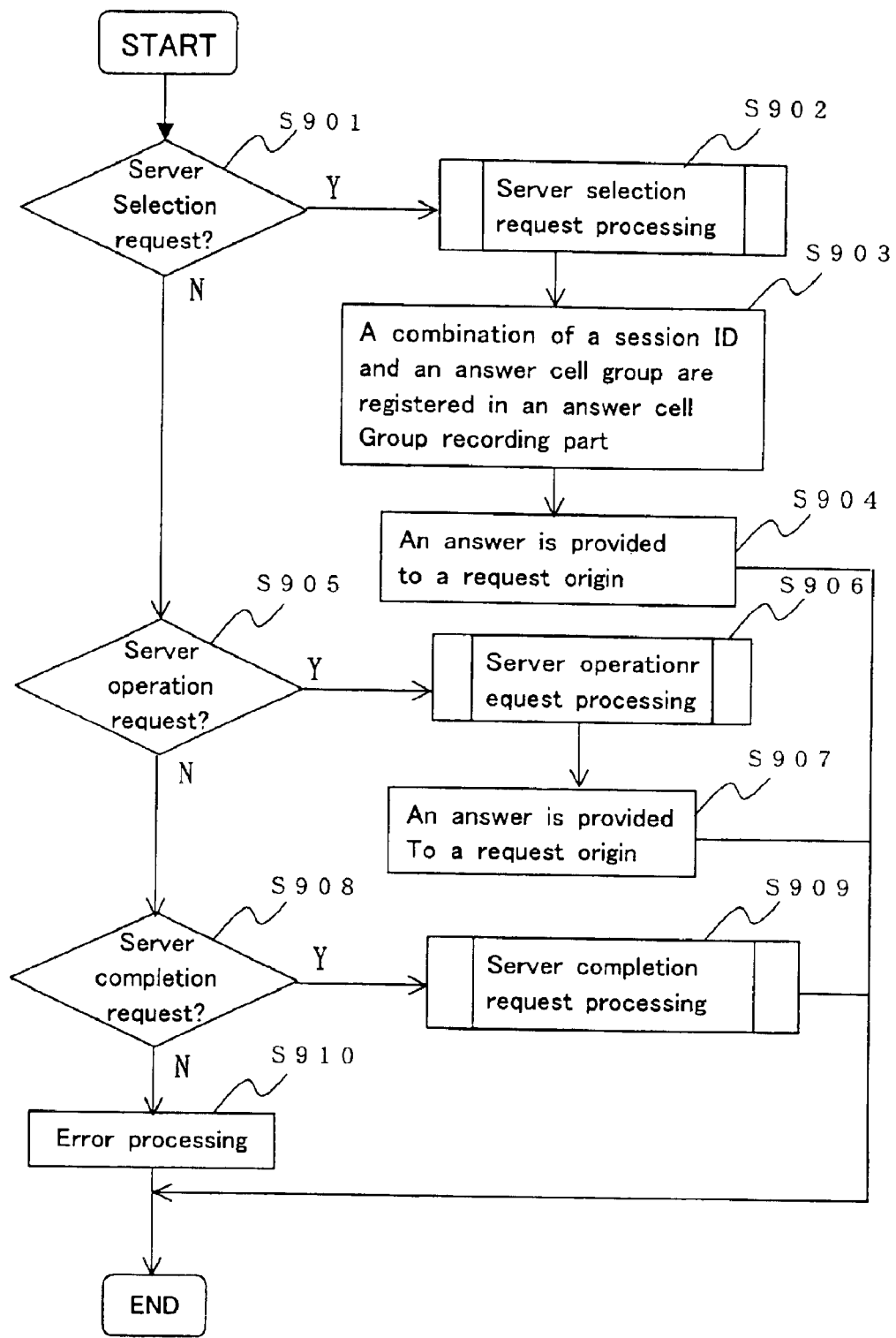
FIG. 9 is a flow chart showing an exemplary individual request processing routine of the input processing part 102 of the facilitator according to the present invention.

FIG. 8 is a flow chart showing, as processing steps, exemplary contents of processing of the input processing part 102. The input processing part 102 converts the request inputted from the input receiving part 101 (Step 801), and assigns a request ID that is a request identification number to the input request (Step S802). The request ID can be used as an identifier for discriminating the request so that the request will not be processed repeatedly, in the case where the request is sent to a plurality of addresses while being propagated among the cells, and passes through separate paths to finally reach the same cell. Next, in Step S803, an individual processing routine is conducted, in which the contents of the request are analyzed, and the contents of processing are executed in accordance with the request. Herein, FIG. 9 shows an exemplary individual request processing routine. In the case where an input request is a server selection request (Step S901: Y), a server selection request processing routine is conducted (Step S902). A combination of a session ID and an answer cell group is registered in the answer cell group recording part 105 as the obtained results (Step S903), and thereafter, the processing results are converted to a user external format to be sent to the request origin (Step S904). The server selection request processing routine will be described later. Furthermore, in the case where an input request is a server operation request (Step S905: Y), a server operation request processing routine is conducted (Step S906). The results are converted to a user external format to be sent to the request origin (Step S907). The server operation request processing routine will be describe later. Furthermore, in the case where an input request is a server completion request (Step S908: Y), a server completion request processing routine is conducted (Step S909). The server completion request processing routine will be described later.

Figure 10:
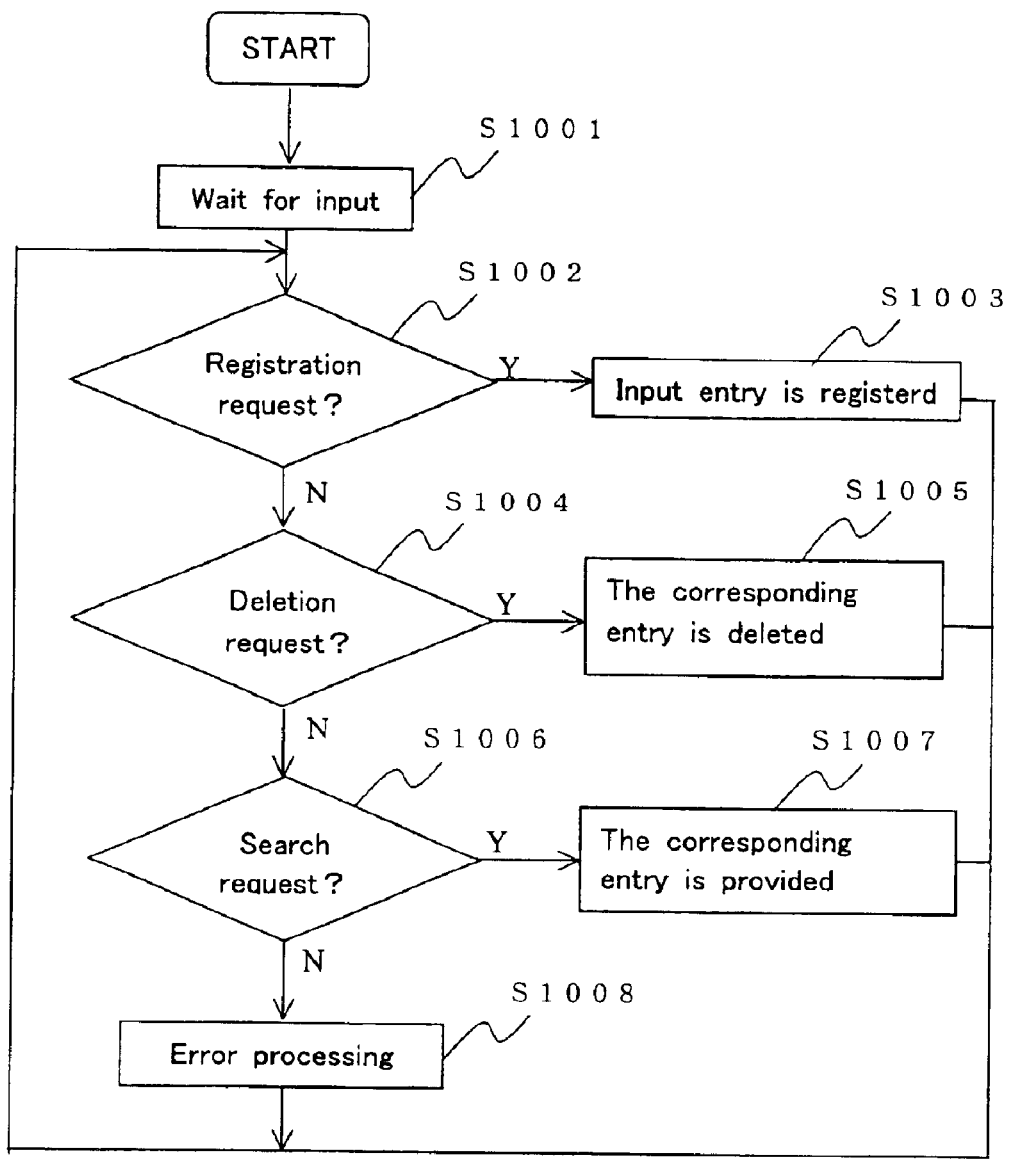
FIG. 10 is a flow chart showing, as processing steps, exemplary processing contents of an answer cell group recording part 103 of the facilitator according to the present invention.

FIG. 10 is a flow chart showing, as processing steps, exemplary contents of processing of the answer cell group recording part 103. In the case where input is a registration request of a selected answer cell group with respect to the server selection request from a user (Step S1002: Y), the answer cell group recording part 103 records an input entry using the session ID as a key (Step S1003). In contrast, in the case where an input content is deletion of the recorded answer cell group information (Step S1004: Y), the recorded answer cell group information is deleted (Step S1005). The recorded answer cell group information is used for a kind of cache function for efficiently providing an answer cell group with respect to the same kind of contents of a request thereafter. In the case where an input content is a search request (Step S1006), the recorded answer cell group is searched for (Step S1007).

Figure 11:
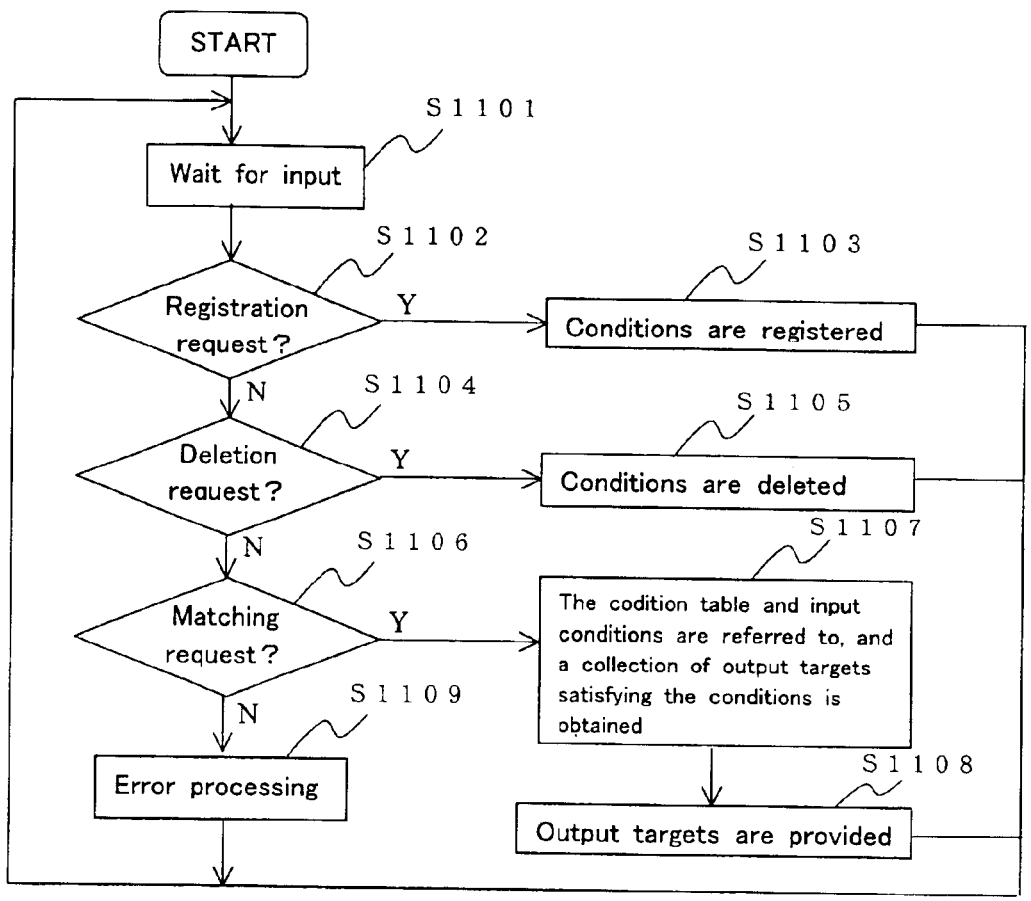
FIG. 11 is a flow chart showing, as processing steps, exemplary processing contents of a condition part 104 of the facilitator according to the present invention.

FIG. 11 is a flow chart showing, as processing steps, exemplary contents of processing of the condition part 104. The condition part 104 holds a condition table for determining a distribution target in accordance with a request and provides the condition table in accordance with the contents of a request. In the case where input is condition information involving a registration request (Step S1002), the condition is registered (Step S1103). Furthermore, in the case where input is the recorded condition information and a request for deleting it (Step S1104), the recorded condition information is deleted (Step S1105). In the case where input is a matching request with respect to the conditions, the condition table is referred to, and output targets satisfying the conditions are returned (Steps S1107 and S1108).

Figure 12:
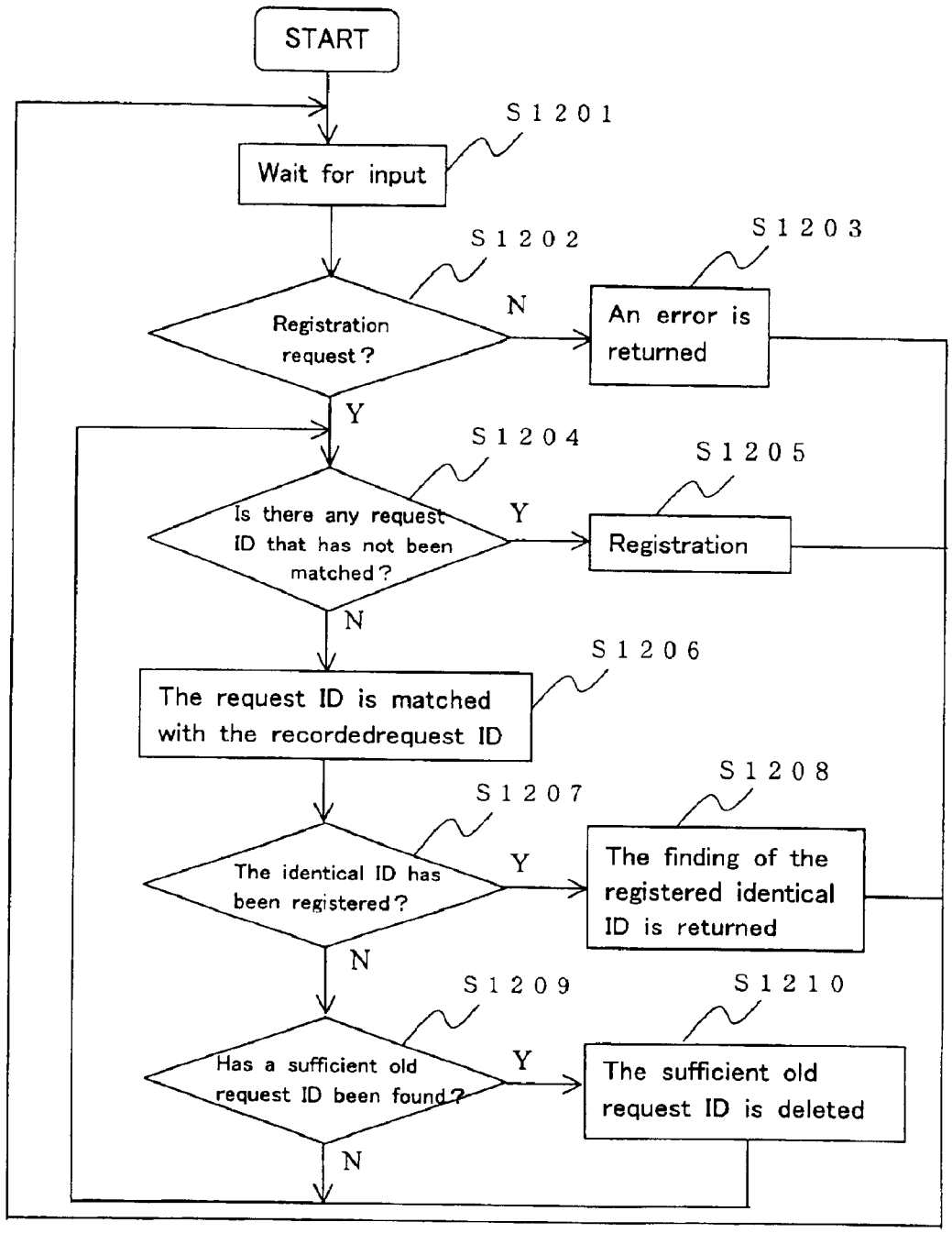
FIG. 12 is a flow chart showing, as processing steps, exemplary processing contents of a request ID recording part 105 of the facilitator according to the present invention.

FIG. 12 is a flow chart showing exemplary processing steps of the request ID recording part 105. The request ID recording part 105 is an internal process for recording a request ID for managing a past processing history. Mainly, the request ID recording part receives a registration request and a search request.

Figure 13:
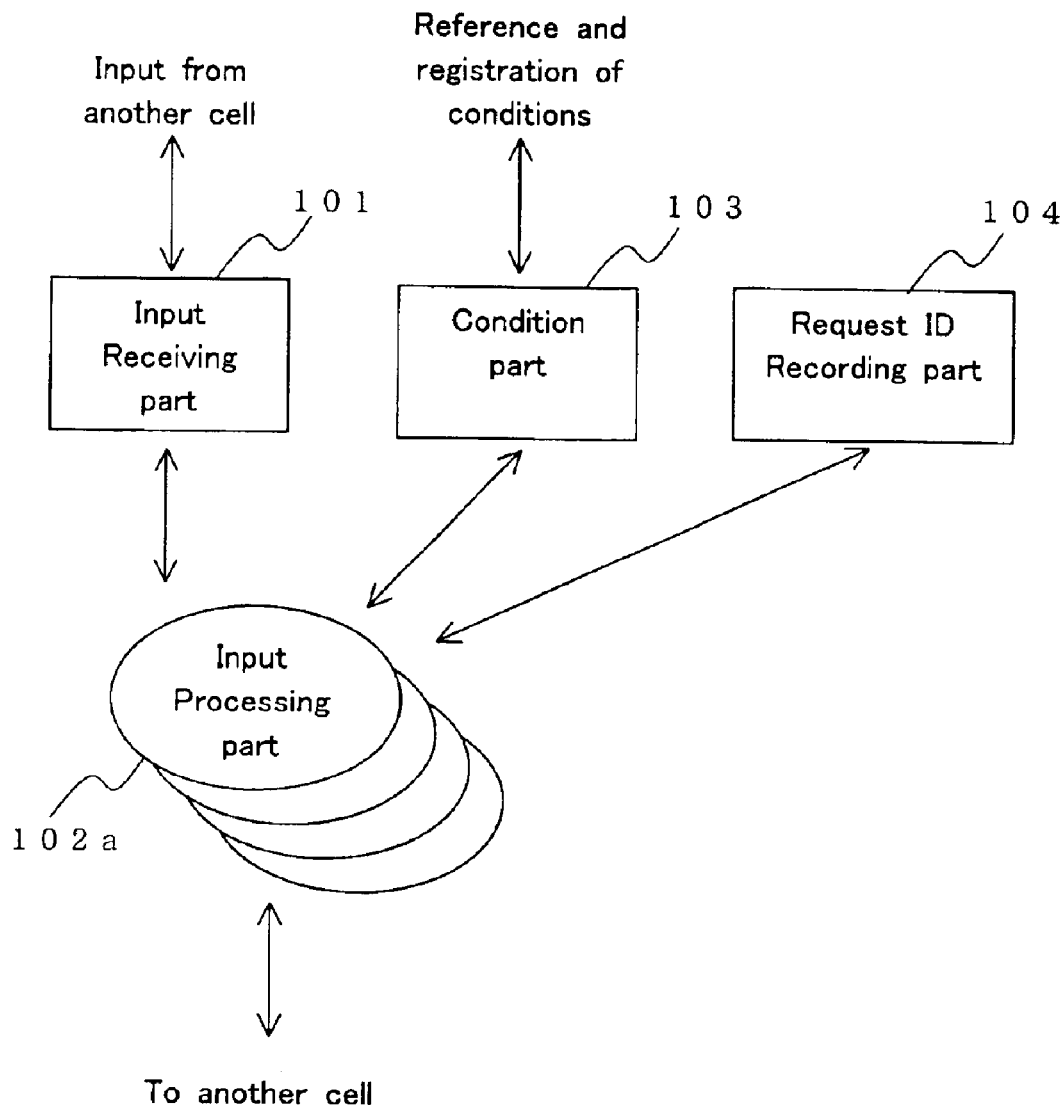
FIG. 13 is a diagram showing an exemplary module configuration of a transfer cell of the facilitator according to the present invention.
Figure 14:
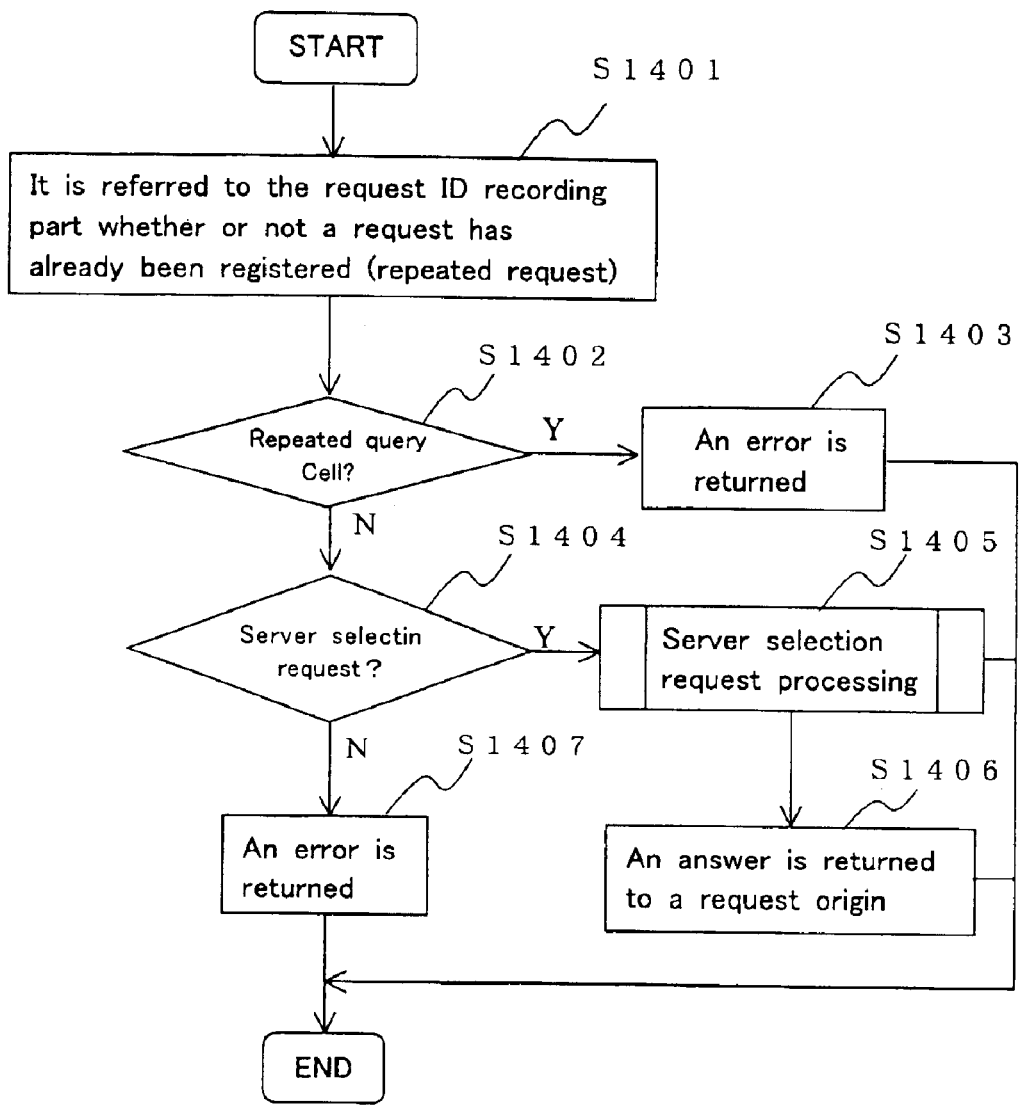
FIG. 14 is a flow chart showing, as processing steps, exemplary processing contents of an input processing part 102a of the transfer cell of the facilitator according to the present invention.

Next, the transfer cell 30 will be described. FIG. 13 shows an exemplary module configuration of the transfer cell 30. The transfer cell 30 is also configured by a plurality of internal processes, and includes an input receiving part 101, an input processing part 102a, a condition part 103, and a request ID recording part 104. Each part is the same process as that of the query cell 20, denoted by the same reference numeral. The description thereof will be omitted here. The input processing part 102a is also a process that is generated every time the input receiving part 101 receives input from an outside in the same way as in the input processing part 102 of the query cell. However, in the input processing part 102a of the transfer cell, as shown in FIG. 14, only the server selection request is processed. It is referred to the request ID recording part 105 whether or not an input request has already been processed (Step S1401). In the case where the input request is not a repeated request (Step S1402: N), and is a selection request of the server 50 (Step S1404: Y), a server selection request processing routine is conducted (Step S1405). The server selection request processing routine will be described later.

Figure 15:
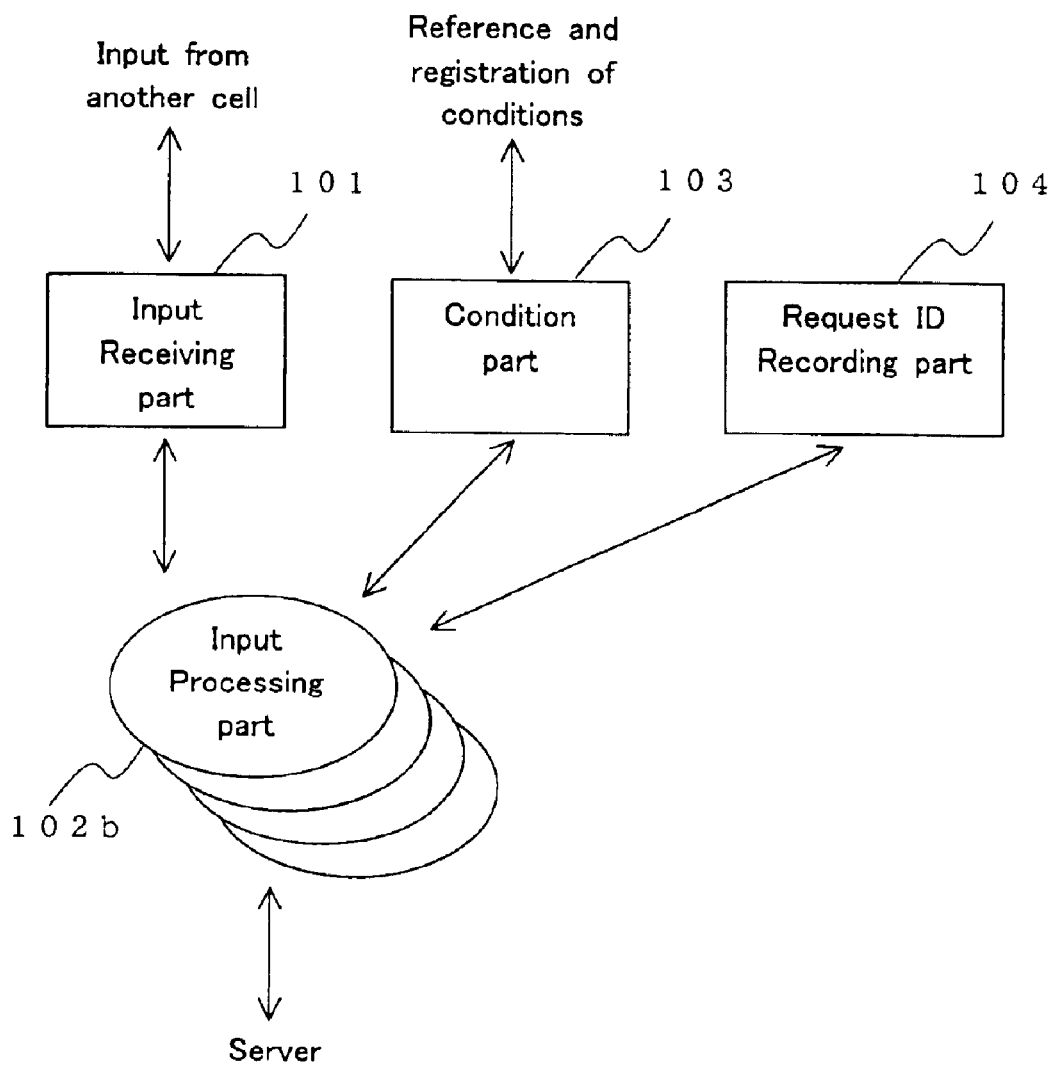
FIG. 15 is a diagram showing an exemplary module configuration of an answer cell of the facilitator according to the present invention.
Figure 16:
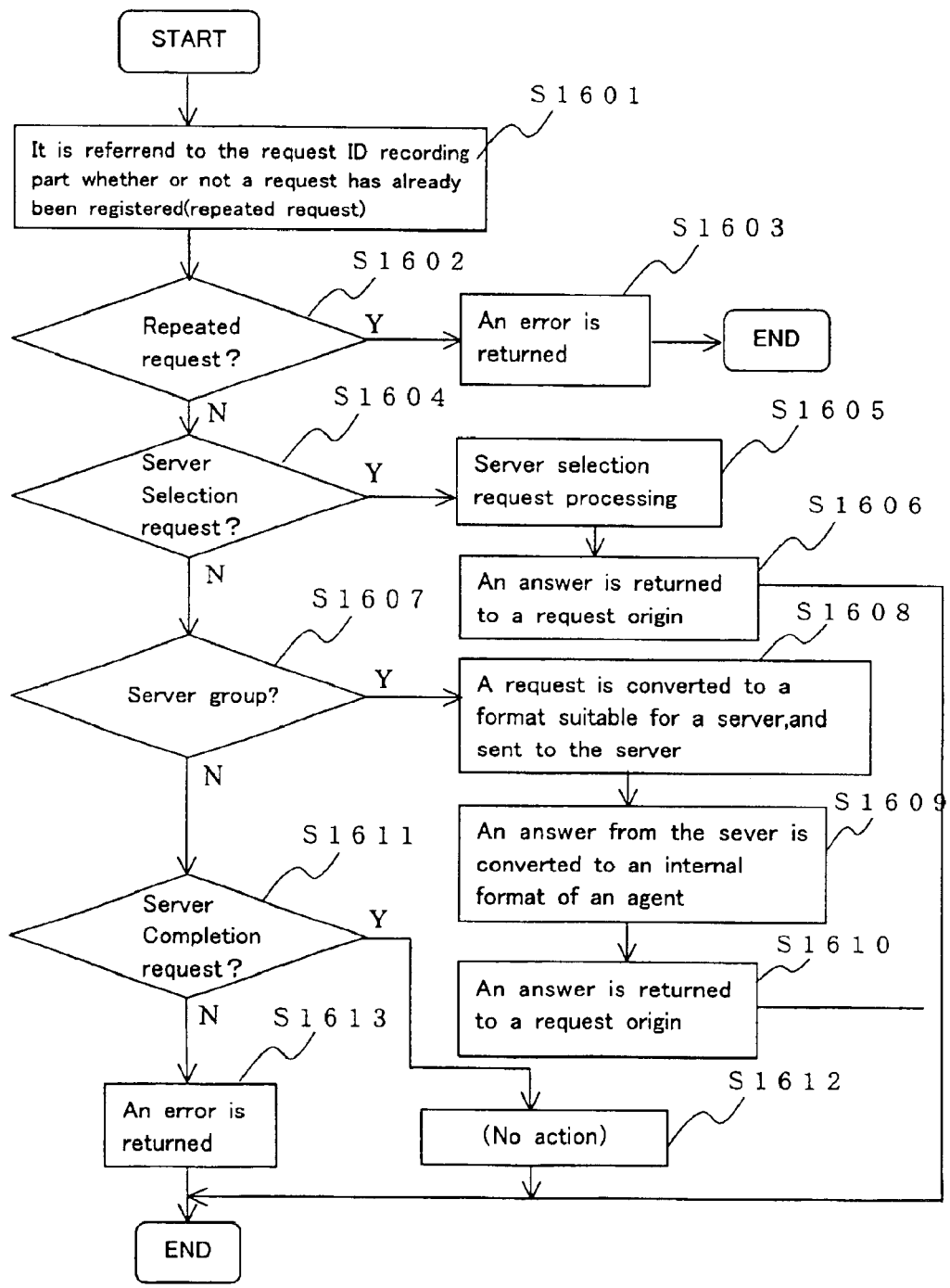
FIG. 16 is a flow chart showing, as processing steps, exemplary processing contents of an input processing part 102b of the answer cell of the facilitator according to the present invention.

Next, the answer cell 40 will be described. FIG. 15 shows an exemplary module configuration of the answer cell 40. The answer cell 40 is also configured by a plurality of internal processes, and includes an input receiving part 101, an input processing part 102b, a condition part 103, and a request ID recording part 104. Each part is the same process as that of the query cell 20, denoted by the same reference numeral. The description thereof will be omitted here. The input processing part 102b is also a process that is generated every time the input receiving part 101 receives input from an outside in the same way as in the input processing part 102 of the query cell 20. However, in the input processing part 102b of the answer cell 40, as shown in FIG. 16, three kinds of requests: a server selection request, a server operation request, and a server completion request are processed. It is referred to the request ID recording part 105 whether or not an input request has already been processed (Step S1601). In the case where the input request is not a repeated request (Step S1602: N), and is a selection request of the server (Step S1604: Y), a server selection request processing routine is conducted (Step S1605). In the case where an input request is a server operation request (Step S1607: Y), a server operation request processing routine is conducted, whereby a server is actually accessed (Steps S1608 to S1610). In the case where an input request is a server completion request (Step S1611: Y), the processing is completed. The server selection request processing routine, the server operation request processing routine, and the server completion request processing routine will be described later.

Figure 17:
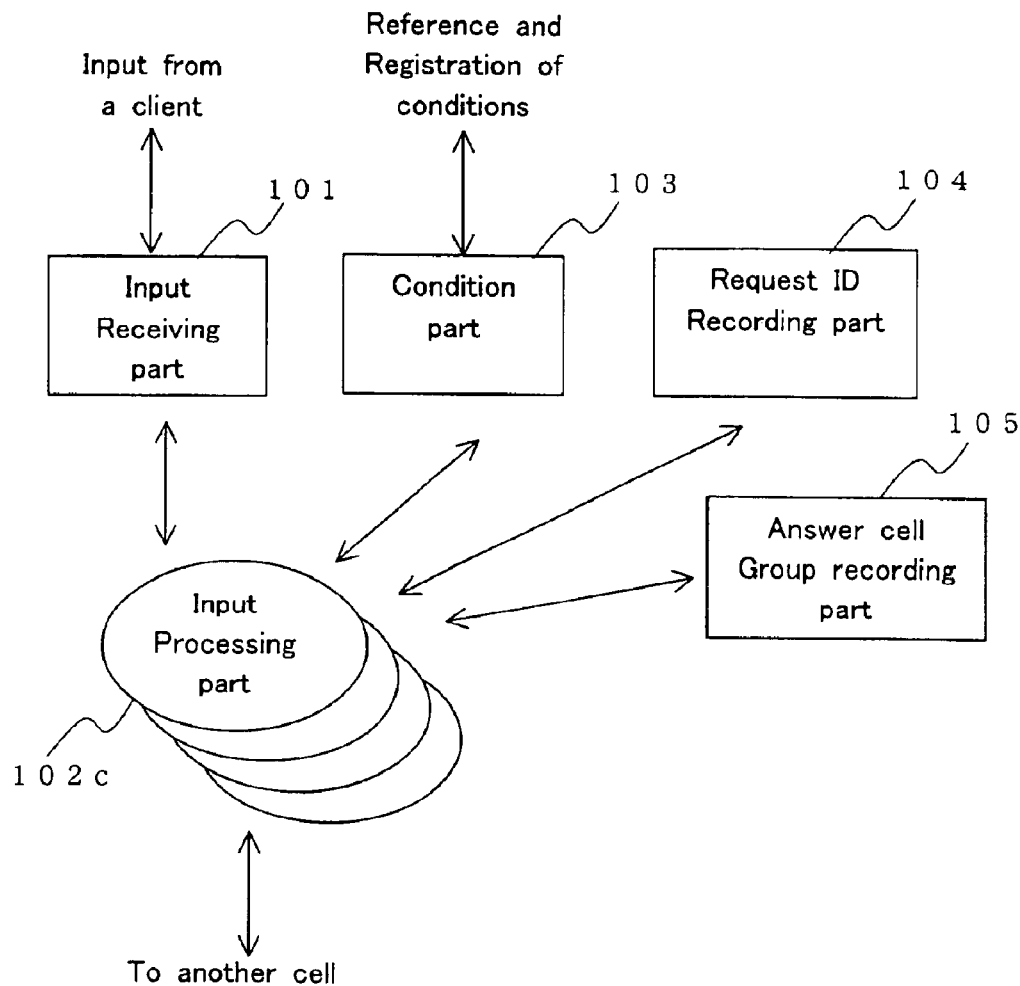
FIG. 17 is a diagram showing an exemplary module configuration of a dual cell of the facilitator according to the present invention.
Figure 18:
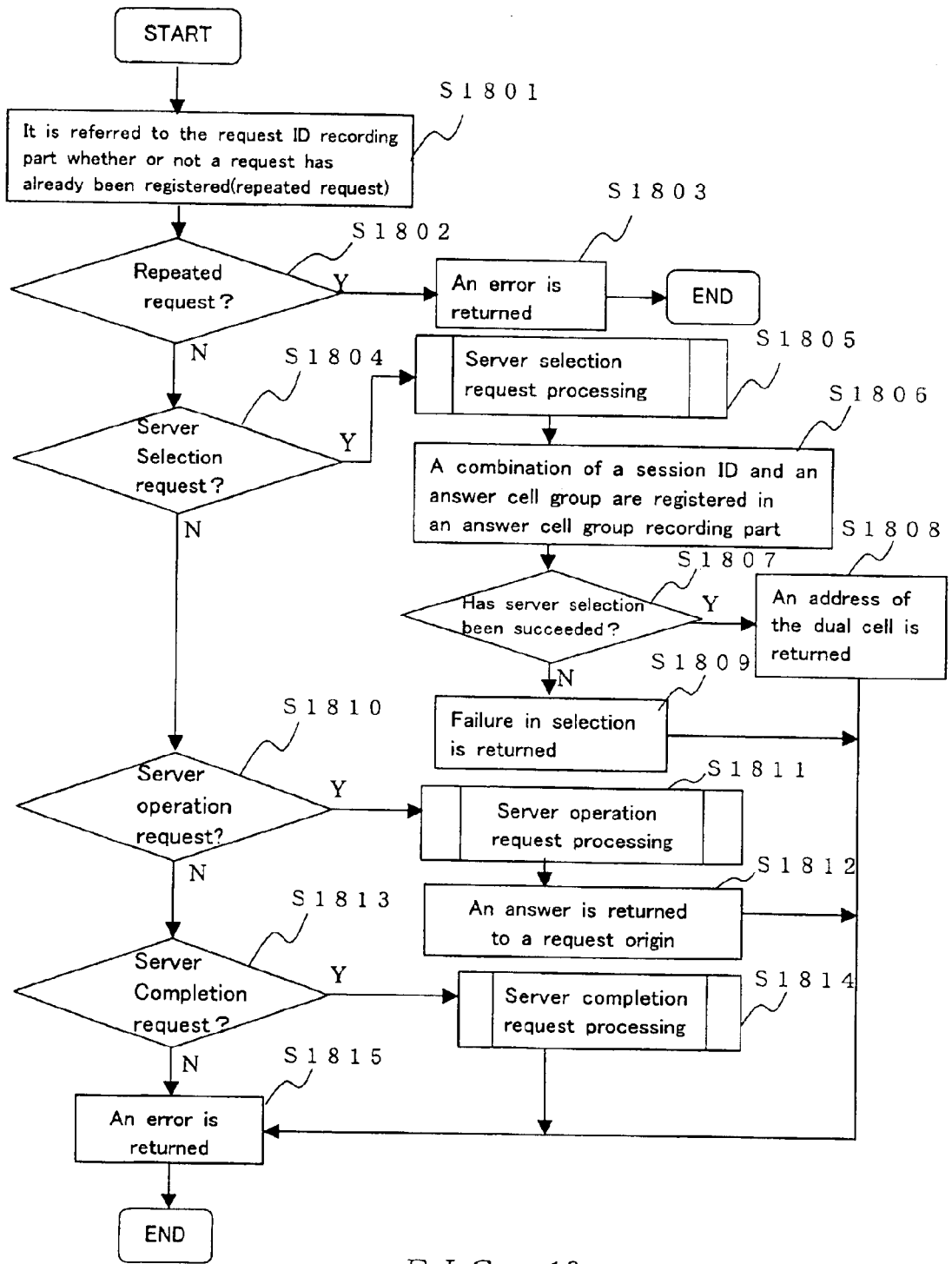
FIG. 18 is a flow chart showing, as processing steps, exemplary processing contents of an input processing part 102c of the dual cell of the facilitator according to the present invention.

Regarding the above-mentioned dual cell 10, internal processes will be described in the same way as in the other cells. FIG. 17 shows an exemplary module configuration of the dual cell 10. The dual cell 10 is also configured by a plurality of internal processes, and includes an input receiving part 101, an input processing part 102c, a condition part 103, a request ID recording part 104, and an answer cell group recording part 105. Each part is the same process as that of the query cell 20, denoted by the same reference numeral. The description thereof will be omitted here. The input processing part 102c of the dual cell 10 is also a process that is generated every time the input receiving part 101 receives input from an outside in the same way as in the input processing part 102 of the query cell 20. However, in the input processing part 102c of the dual cell 10, as shown in FIG. 18, three kinds of requests: a server selection request, a server operation request, and a server completion request are processed. It is referred to the request ID recording part 105 whether or not an input request has already been processed (Step S1801). In the case where the input request is not a repeated request (Step S1802: N), and is a selection request of the server (Step S1804: Y), a server selection request processing routine is conducted (Step S1805). The query is transferred to the subsequent cell to select an appropriate answer cell 40; thereafter, a combination of a session ID and an answer cell group is stored in the answer cell group recording part 105 (Step S1806), and an address of the dual cell 10 is returned (Step S1808). Due to this processing, the query cell 20 is notified of the address of the dual cell 10, and the address of the answer cell group on the server side is concealed.

In the case where an input request is a server operation request (Step S1801: Y), the dual cell transfers the request to the recorded answer cell 40 (Step S1811), and the answer results are organized and returned to the query cell 20 (Step S1812). Furthermore, in the case where an input request is a server completion request (Step S1813: Y), a server completion request processing routine is conducted to complete the processing (Step S1814). The server selection request processing routine, the server operation request processing routine, and the server completion request processing routine will be described later.

Each constituent part of the facilitator having a distributed configuration of the present invention shown in FIG. 1 has been described above.

Next, a flow of the entire processing of the facilitator having a distributed configuration of the present invention shown in FIG. 1 will be described.

The processing of a cell group of the facilitator having a distributed configuration of the present invention is conducted roughly in the following three stages. They are selection processing of an answer cell group in the first processing stage, request and answer processing in the second processing stage, and server selection initializing processing in the third stage. The reason for separating the processing stage into the selection processing of an answer cell group in the first stage and the request and answer processing in the second stage as described above is that, in practical use, users are likely to make the same kind of requests, and a request may be repeated with respect to the server selected in the past. If the processing stage is separated as described above, it is not required to conduct selection processing of an answer cell group every time a request is repeated, and the past selection results can be used. More specifically, a series of processings are separated into the selection processing of an answer cell group in the first stage and the request and answer processing in the second stage, whereby the selection processing of an answer cell group in the first stage can be omitted.

Figure 2:
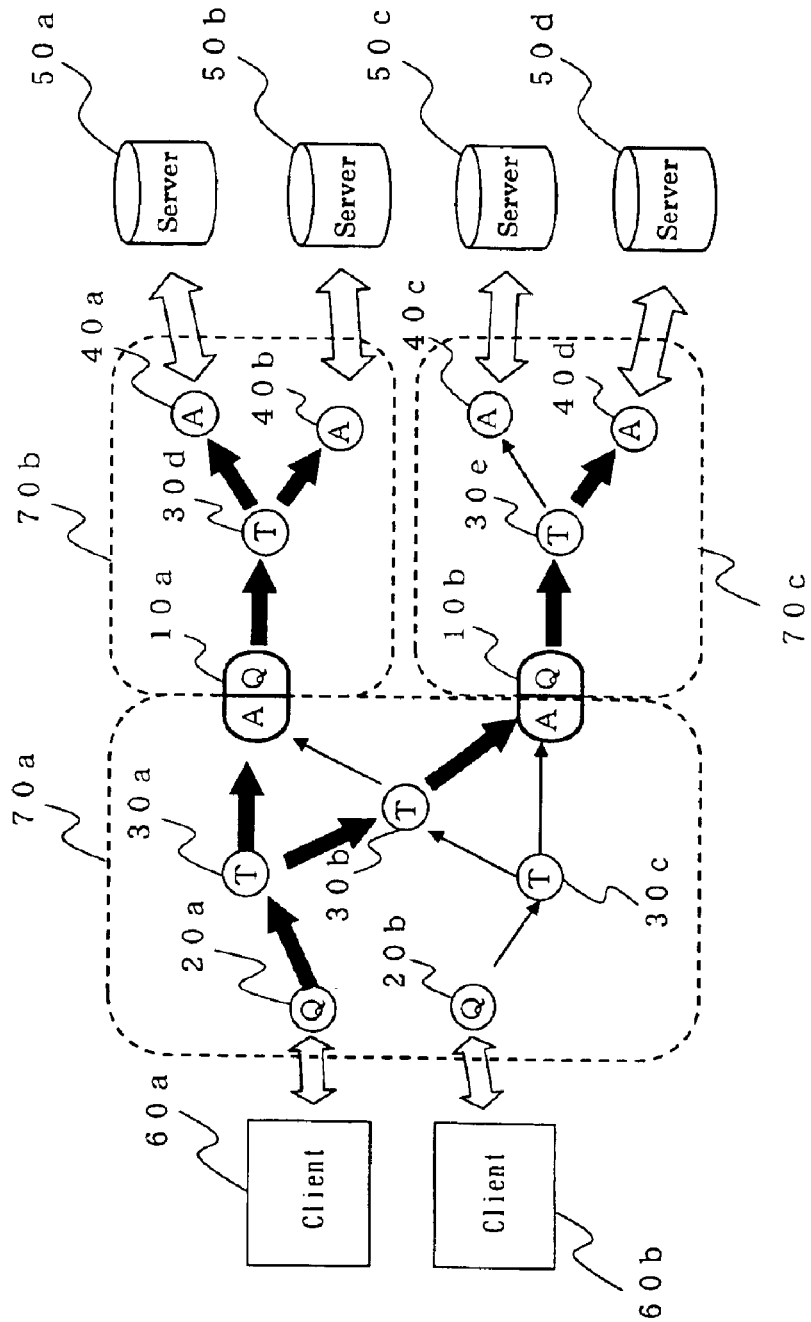
FIG. 2 is a diagram showing a concept of processing of selecting an answer cell group (servers) of the facilitator according to the present invention.

First, the selection processing of an answer cell group (server) in the first stage will be described with reference to FIG. 2. The selection processing of an answer cell group is a stage where an individual server satisfying a request from a user is selected.

Figure 19:
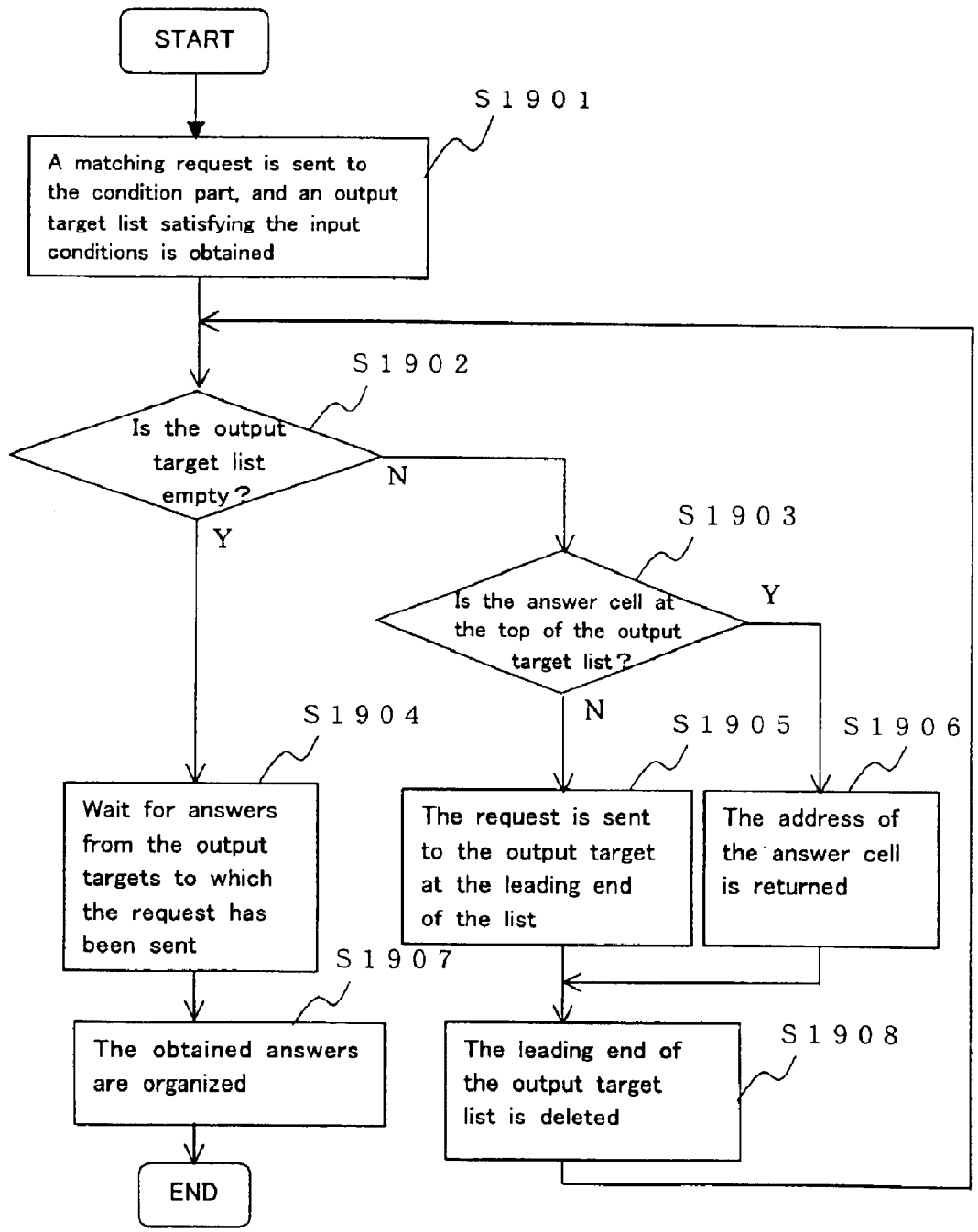
FIG. 19 is a flow chart showing, as processing steps, an exemplary server selection request processing routine of a query cell 21 of the facilitator according to the present invention.

First, for example, the query cell 20a makes a server selection request based on a request from the user 60a (Step S902 of the individual request processing routine shown in FIG. 9). The query cell 20a conducts a server selection request processing routine. FIG. 19 shows an exemplary server selection request processing routine. The server selection request processing routine is described in a common format of all the kinds of cells. First, the query cell 20a sends a matching request to the condition part 103, obtains an output target list satisfying input conditions (Step S1901), and sends the server selection request in accordance with the output target list (Step S1904). In an example shown in FIG. 2, the query cell 20a sends the server selection request to the transfer cell 30a. The transfer cell 30a similarly conducts the server selection request processing routine shown in FIG. 19, and transfers the server selection request to transfer targets satisfying the conditions based on the held condition table. In an example shown in FIG. 2, the transfer cell 30a transfers the server selection request to the dual cell 10a and the transfer cell 30b, and the server selection request is further transferred from the transfer cell 30b to the dual cell 10b. The dual cell 10a is present as a connecting point on the border between the group 70a and the group 70b. The server selection request is transferred to the transfer cell 30d of the group 70b, and further transferred to the answer cells 40a and 40b. On the other hand, the dual cell 10b is present as a connecting point on the border between the group 70a and the group 70c. The server selection request is transferred to the transfer cell 30e of the group 70c. In the transfer cell 30e, the conditions of the answer cell 40c are not satisfied, and only the conditions of the answer cell 40d are satisfied. The server selection request is transferred only to the answer cell 40d.

The answer cells 40a, 40b, and 40d having received the request conduct the server selection processing routine shown in FIG. 19. In the case where the server selection processing request satisfies their own conditions, that is, in the case where they are included in the output target list (Step S1903: Y), the addresses of the answer cells 40a, 40b, and 40d are returned (Step S1905). In the case where the server selection processing request does not satisfy the conditions, an error is notified.

Upon receiving the server selection request, the dual cells 10a and 10b transfer it to the subsequent output targets. Upon receiving answers from the answer cells 40a, 40b, and 40d, the dual cells 10a and 10b rewrite the addresses of the servers 50a, 50b, and 50d to their addresses in Step S1908 (not shown in Step S1908), and organize the answers to transfer them to the request origin side, thereby making themselves look as if they are answer cells.

As described above, when the answers to all the messages sent from each cell are collected, each cell organize and send them to the request origin. This operation is repeated, and all the answers keep track of the path, in which the request has been sent, in an opposite direction, and are finally collected at the query cell 20a. Because of this, the query cell 20a and the dual cells 10a and 10b obtain an answer cell group that is a collection of the selected answer cell 40 and the dual cell 10. The query cell 20 and the dual cell 10 store the answer cell group in the answer cell group recording part 105 in combination with the session ID attached to the request.

Next, the server operation request and answer processing in the second stage of the facilitator processing operation will be described with reference to FIG. 3. The server operation request and answer processing is a stage where the query cell 20a directly sends a server operation request to the dual cells 10a and 10b (not to the cell selected from the answer cell group, i.e., in this case, the answer cell 40) without sending the request to the transfer cell 30.

Figure 3:
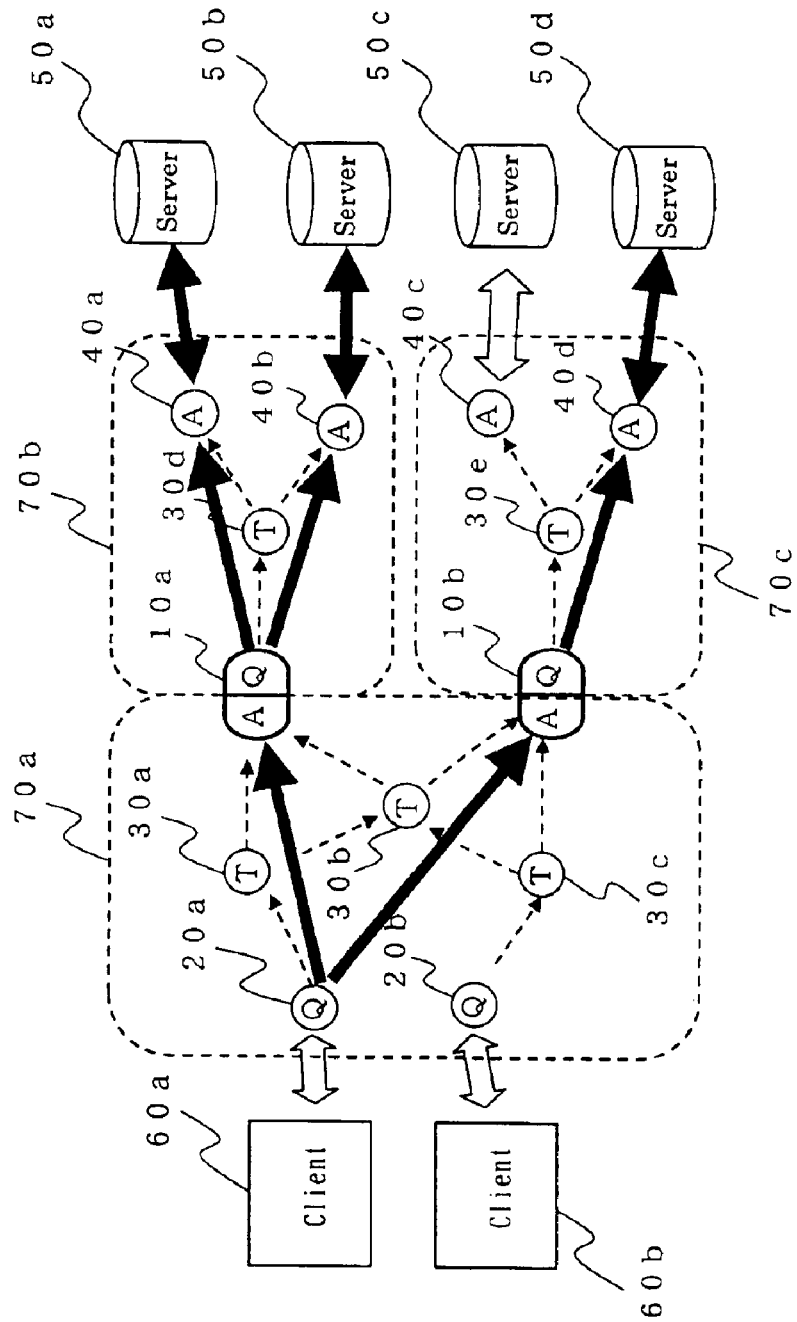
FIG. 3 is a diagram showing a concept of server operation request and answer processing of the facilitator according to the present invention.
Figure 20:
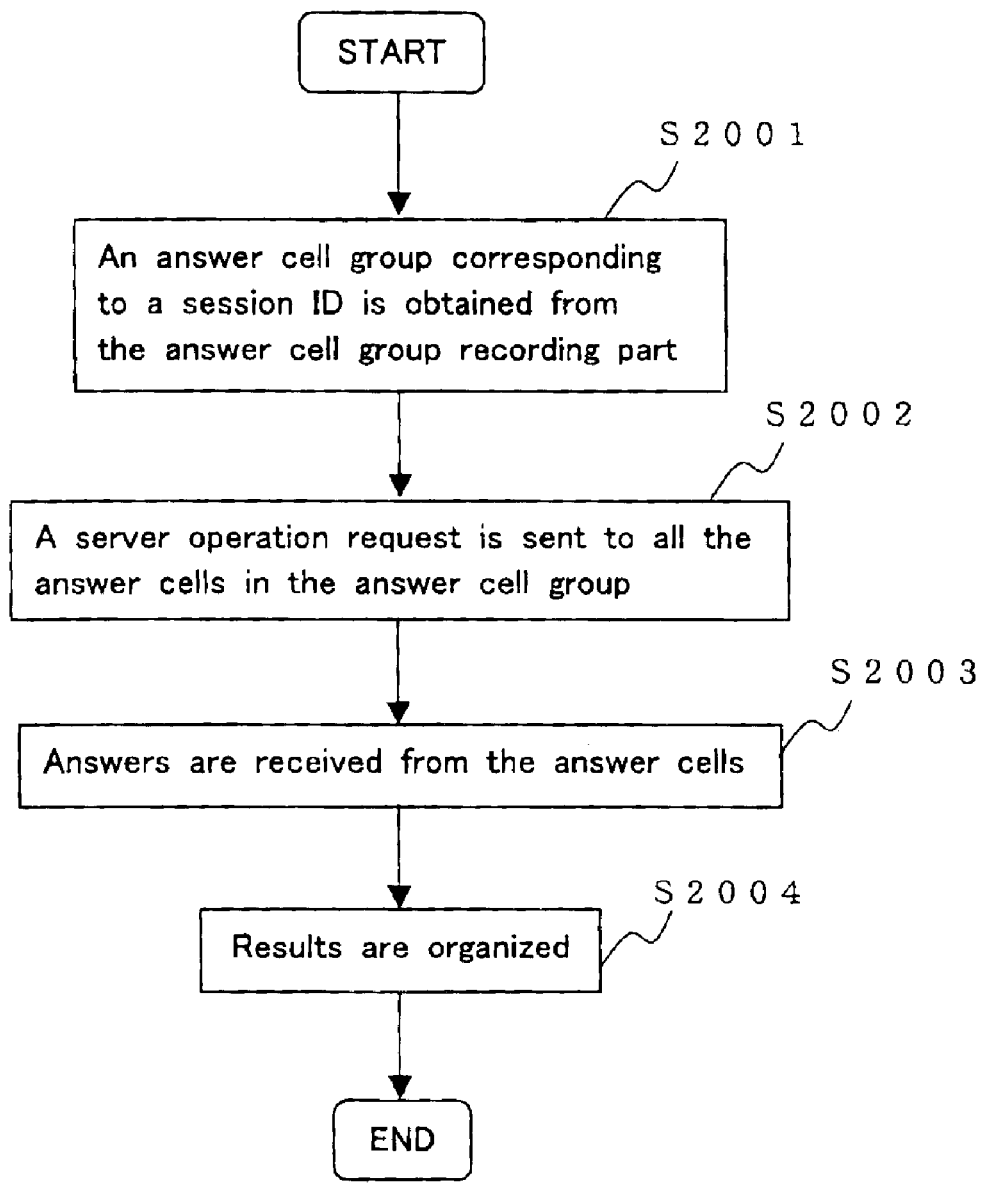
FIG. 20 is a flow chart showing, as processing steps, an exemplary server operation request processing routine of the query cell 21 of the facilitator according to the present invention.

In an example shown in FIG. 3, when the query cell 20a detects input of a server operation request based on the server operation request input from the user terminal 60a (Step S905 of the individual request processing routine shown in FIG. 9: Y), the server operation request processing routine is conducted. FIG. 20 shows an exemplary server operation request processing routine. The query cell 20a obtains an answer cell group corresponding to a session ID from the answer cell group recording part 105 (Step S2001), and sends the server operation request to all the answer cells 40 in the answer cell group (Step S2002). In an example shown in FIG. 3, the server operation request is transferred to the dual cells 10a and 10b, and is not directly transferred to the answer cell 40 in the groups 70b and 70c. The dual cells 10 and 10b transfer the server operation request to the actually corresponding answer cells 40a, 40b, and 40d in the similar transfer procedure.

The answer cells 40a, 40b, and 40d actually access the servers 50a, 10b, and 50d to give the received server operation request to them, and allow the obtained answers to keep track of the path in an opposite direction to provide them to the dual cells 10a and 10b. The dual cells 10a and 10b organize the answers and transfer them to the query cell 20a that is the request origin (Step S2003). The query cell 20a organizes the answers obtained from the dual cells 10a and 10b to provide them to the user 60a (Step S2004).

In the above-mentioned processing, an answer to a query (request) made by a user is obtained via the dual cell 10 by the processing of the facilitator.

Next, the server selection initializing processing in the third stage of the facilitator processing operation will be described with reference to FIG. 4. The server selection initializing processing is a final processing stage in the case where a series of processings using the faciliator 10 is completed.

Figure 4:
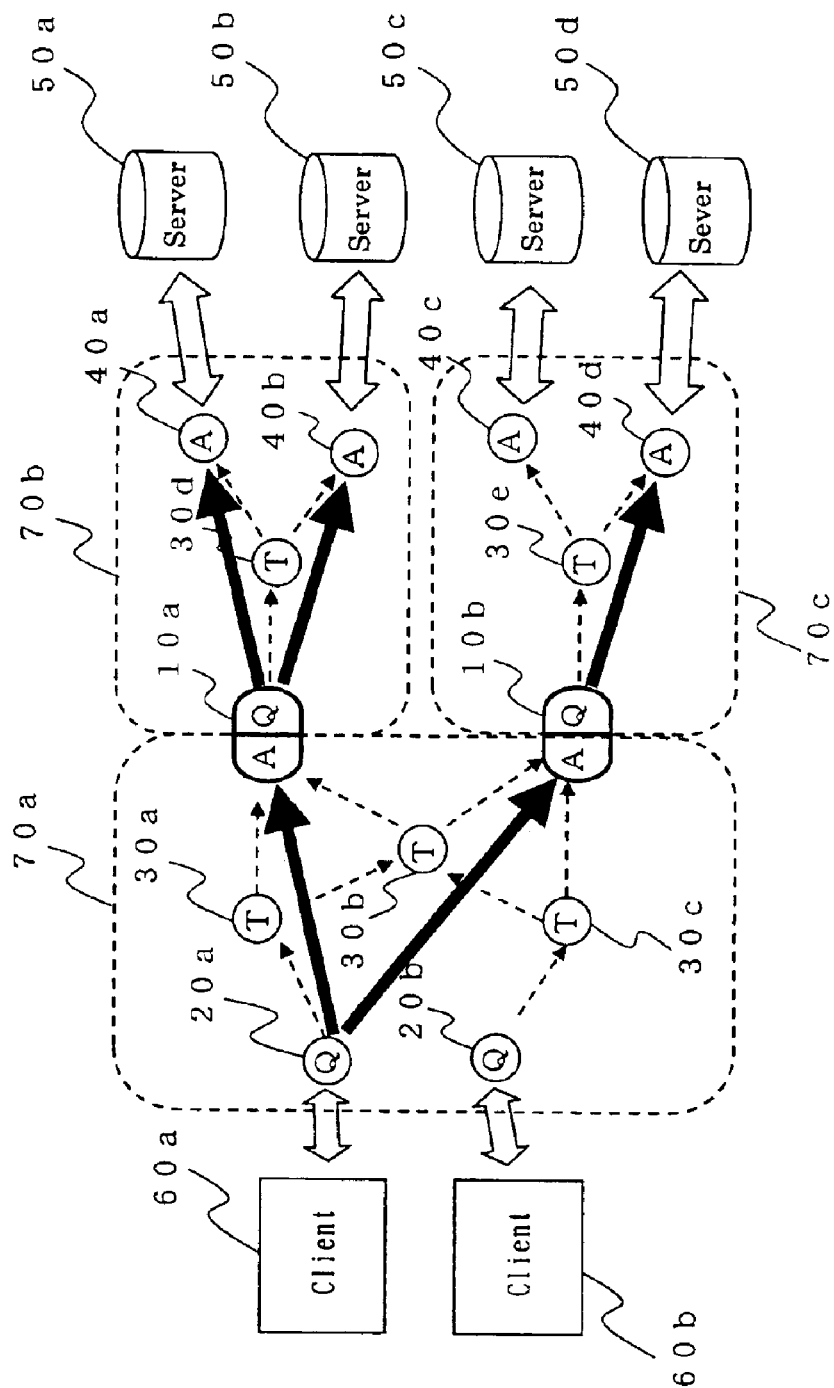
FIG. 4 is a diagram showing a concept of server selection initializing processing of the facilitator according to the present invention.
Figure 21:
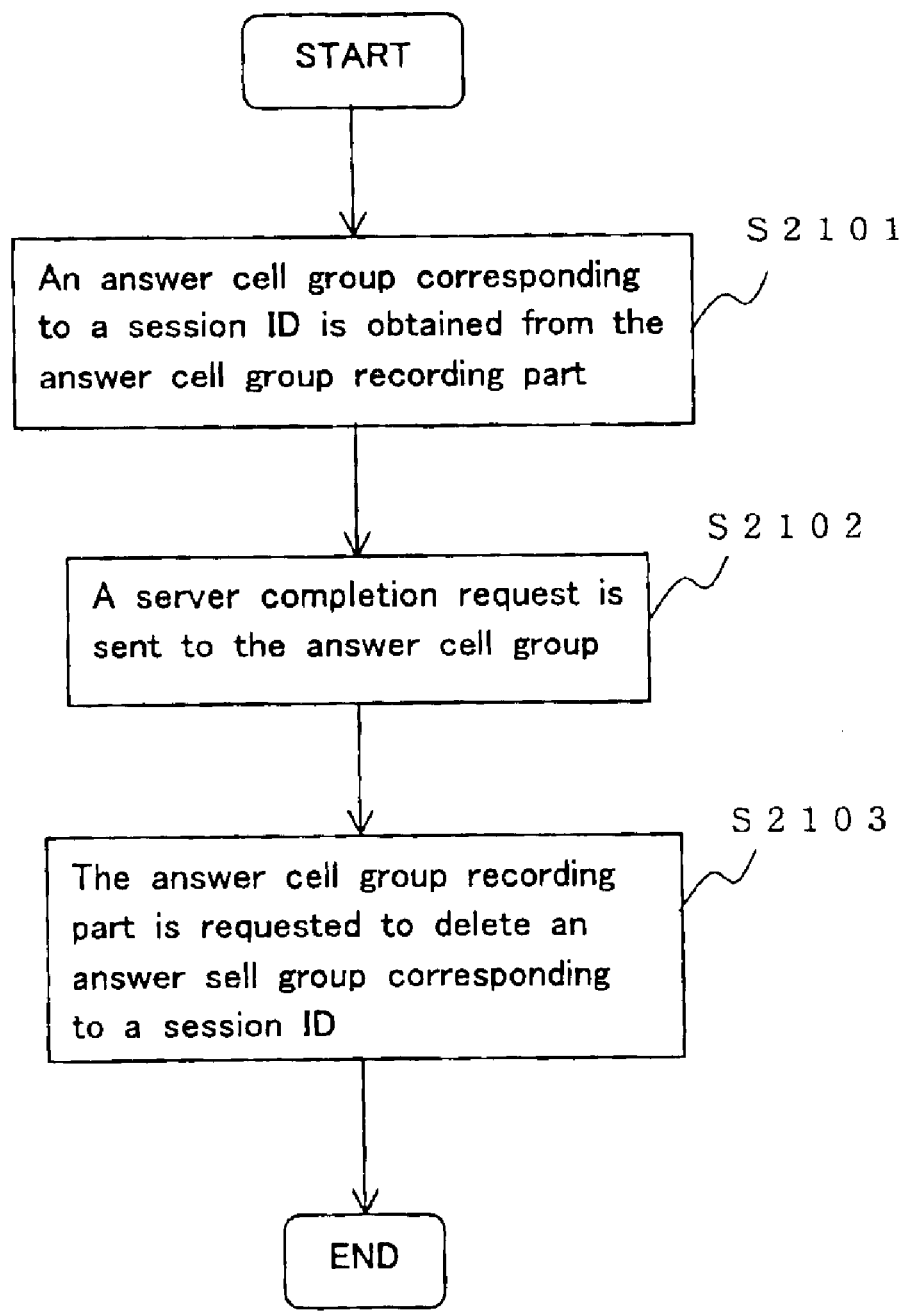
FIG. 21 is a flow chart showing, as processing steps, an exemplary server completion request processing routine of the query cell 21 of the facilitator according to the present invention.

In an example shown in FIG. 4, when detecting input of a server completion request based on the server completion request input from the user terminal 60a (Step S908 of the individual request processing routine shown in FIG. 9: Y), the query cell 20a conducts a server completion request processing routine. FIG. 21 shows an exemplary server completion request processing routine. The query cell 20a obtains an answer cell group corresponding to a session ID from the answer cell group recording part 105 (Step S2101), and sends a server completion request to the answer cell group (Step S2102). The server completion request is transferred to the dual cells 10a and 10b by the transfer procedure similar to that described in the request and answer processing in the second processing stage. The dual cells 10a and 10b having received the server completion request deletes a combination of the answer cell group corresponding to the session ID of the answer cell group recording part 105 (Step S2103).

The outline of the entire processing of the facilitator having a distributed configuration of the present invention has been described above.

The facilitator of Embodiment 1 is configured so as to have a distributed configuration using a dual cell 10, whereby a query (request) from the user 60 always passes through the dual cell 10 disposed on the border between groups. Therefore, even in the case where there are a group and a cell with low security on a wide area network, the security of data communication can be ensured. Furthermore, cells in a system can be flexibly changed only by altering the setting of a dual cell.

Embodiment 2

A facilitator having a distributed configuration of Embodiment 2 will be described, in which a group including user terminals is different from a group including servers, and the group including user terminals is connected to the group including servers via a plurality of dual cells, whereby a load concentration is prevented.

Figure 22:
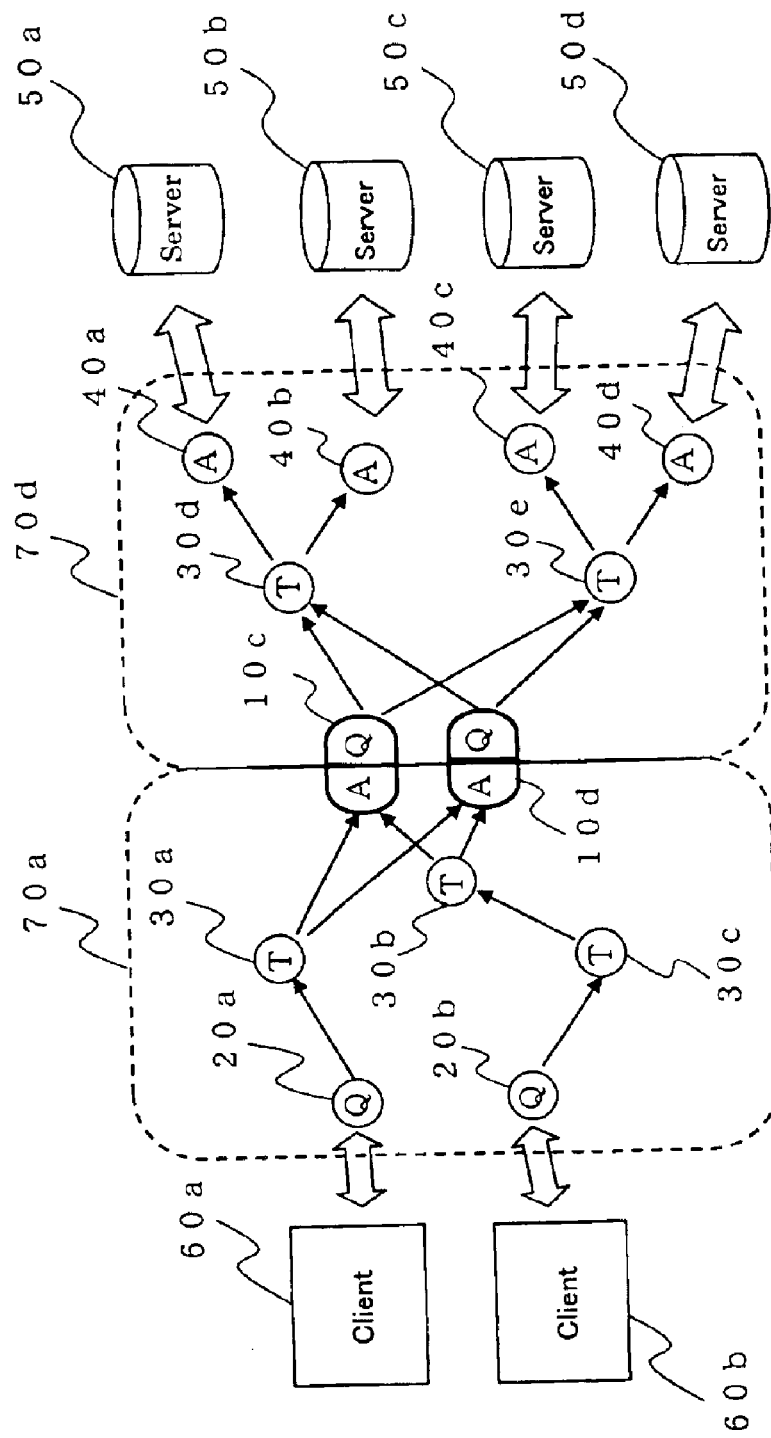
FIG. 22 is a schematic diagram showing an entire configuration of a facilitator having a distributed configuration of Embodiment 2 according to the present invention.

The outline of the entire configuration of the facilitator having a distributed configuration of Embodiment 2 will be described with reference to the drawings. FIG. 22 is a schematic diagram showing the entire configuration of the facilitator having a distributed configuration of Embodiment 2. In FIG. 22, the same elements as those in FIG. 1 are denoted by the same reference numerals as those therein, and the description of the same operation as that in Embodiment 1 will be omitted. In an example shown in FIG. 22, two dual cells 10*c* and 10*d* are provided on the border between groups 70*a* and 70*d*. The dual cell 10*c* is the same as the dual cell 10*d*, and they are activated in parallel. More specifically, two channels are provided between the groups 70*a* and 70*d*, whereby the same effect as that in the case where a load is distributed is obtained.

The processing operation of the facilitator is similar to that in Embodiment 1, except that the dual cells 10*c* and 10*d* are activated in parallel. Therefore, the description thereof will be omitted here.

Embodiment 3

A facilitator having a distributed configuration of Embodiment 3 will be described, in which a group including a user terminal is different from a group including a server, a firewall is provided between the group including a user terminal and the group including a server, and a dual cell is provided on the firewall.

Figure 23:
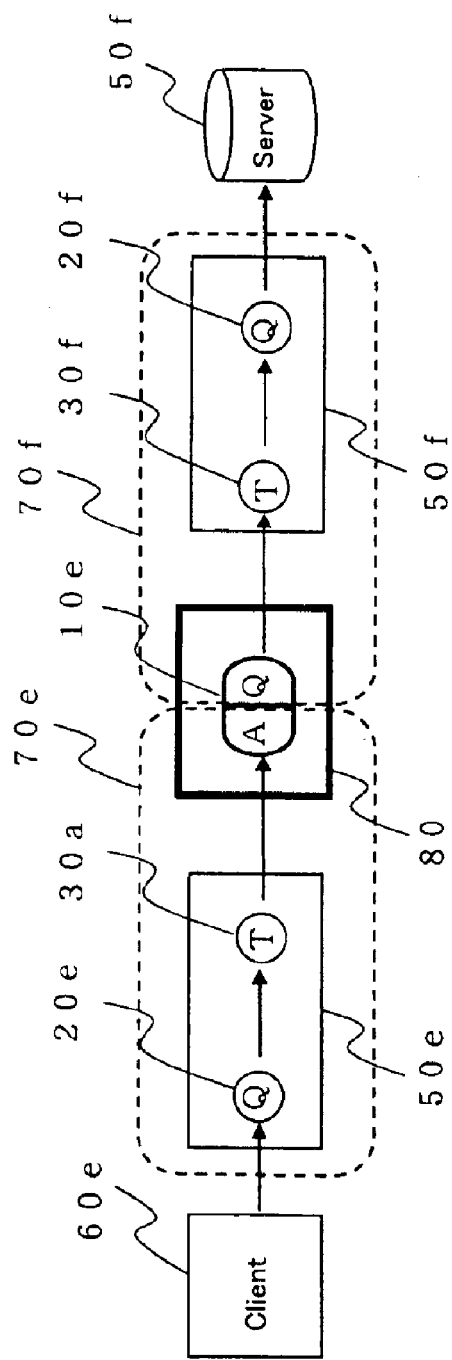
FIG. 23 is a schematic diagram showing an entire configuration of a facilitator having a distributed configuration of Embodiment 3 according to the present invention.

The outline of the entire structure of the facilitator having a distributed configuration of Embodiment 3 will be described with reference to the drawings. FIG. 23 is a schematic diagram showing the entire configuration of the facilitator having a distributed configuration of Embodiment 3. In FIG. 23, the same elements as those in FIG. 1 are denoted by the same reference numerals as those therein, and the same operation as that in Embodiment 1 will be omitted. In an example shown in FIG. 23, a firewall 80 of a network is provided on the border between groups 70*e* and 70*f*. A dual cell 10*e* is provided on the firewall 80. The dual cell 10*e* is the same as the dual cell 10*a*, etc. described in Embodiment 1. The dual cell 10*e* is conceptually provided across the border on the network partitioned by the firewall 80. A portion of the dual cell 10*e* functioning as the answer cell 40 belongs to the left side of the firewall 80 (i.e., the group 70*e* side), and a portion thereof functioning as the query cell 20 belongs to the right side of the firewall 80 (i.e., the group 70*f* side), whereby the security of the network is enhanced. The processing operation of the facilitator is the same as that in Embodiment 1, except that the dual cell 10*e* is provided on the firewall 80. Therefore, the description thereof will be omitted here.

Embodiment 4

In a facilitator having a distributed configuration of Embodiment 4, there are two groups each including both a user terminal and a server, a user can use a server belonging to his/her group and a server belonging to the other group, and bidirectional communication can be conducted between the groups.

Figure 24:
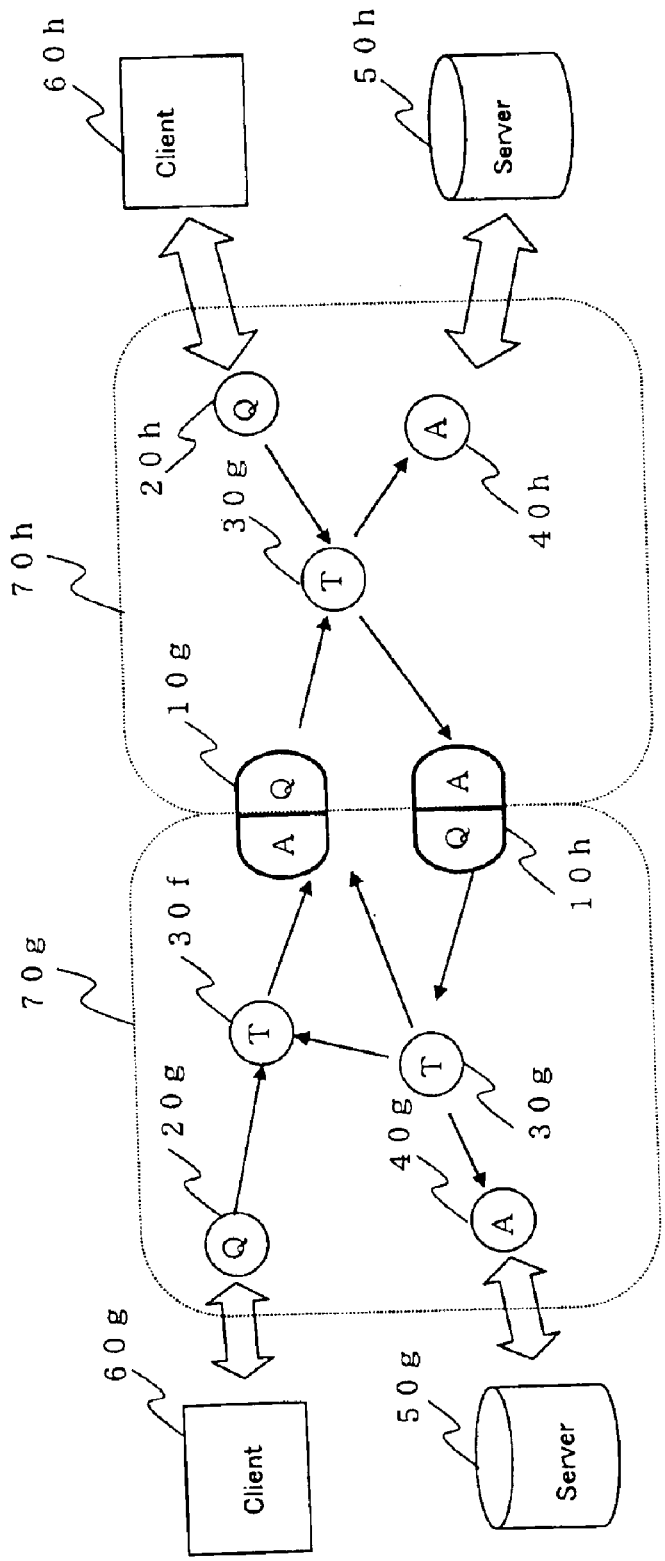
FIG. 24 is a schematic diagram showing an entire configuration of a facilitator having a distributed configuration of Embodiment 4 according to the present invention.

The outline of the entire configuration of the facilitator having a distributed configuration of Embodiment 4 will be described with reference to the drawings. FIG. 24 is a schematic diagram showing the entire configuration of the facilitator having a distributed configuration of Embodiment 4. In FIG. 24, the same elements as those in FIG. 1 are denoted by the same reference numerals as those therein, and the description of the same operation as that in Embodiment 1 will be omitted. In an example shown in FIG. 24, a user 60*g* and a server 50*g* belong to a group 70*g*, and a user 60*h* and a server 50*h* belong to a group 70*h*. An answer cell 40*g* is provided so as to correspond to the server 50*g*, a query cell 20*g* is provided so as to correspond to the user 60*g*, an answer cell 40*h* is provided so as to correspond to the server 50*h*, and a query cell 20*h* is provided so as to correspond to the user 60*h*.

On the border between the groups 70*g* and 70*h*, dual cells 10*g* and 10*h* are provided. Herein, the dual cells 10*g* and 10*h* are characterized by being provided so as to have a communication direction opposite to each other. More specifically, a portion functioning as the query cell 20 belongs to the group 70*g* side, and a portion functioning as the answer cell 40 belongs to the group 70*h* side.

As described above, by providing a required number of dual cells in different directions, bidirectional communication between groups is made possible. More specifically, the answer cell portion of the dual cell 10*g* looks as an answer cell from the user 60*g* side, and the answer cell portion of the dual cell 10*g* behaves like the answer cell 40*h* corresponding to the server 50*h*. On the server 50*h* side, the query cell portion of the dual cell 10*g* behaves like the query cell 20*g* corresponding to the user 60*g*. In contrast, the answer cell portion of the dual cell 10*h* looks as an answer cell from the user 60*h* side, and the answer cell portion of the dual cell 10*h* behaves like the answer cell 40*g* corresponding to the server 50*g*. On the server 50*g* side, the query cell portion of the dual cell 10*h* behaves like the query cell 20*h* corresponding to the user 60*h*.

As described above, the facilitator having a distributed configuration of Embodiment 4 enables bidirectional communication to be conducted.

Embodiment 5

In a facilitator having a distributed configuration of Embodiment 5, there are at least three groups each including both a user terminal and a server, a user can use a server belonging to his/her group and a server belonging to the other groups, and the groups are connected to each other so that they access each other to conduct bidirectional communication.

There are some systems of connecting at least three groups each including both a user terminal and a server.

The first connection system is that each group is connected to the other groups individually in a one-to-one relationship. This corresponds to the case where the system of connecting two groups described in Embodiment 4 is applied to the connection among a plurality of groups. More specifically, in the case where the number of groups is N, since one group is connected to the other (N−1) groups, groups are connected at {N(N−1)/2} points. According to this system, as the number N of groups is increased, the connection positions are also increased. Furthermore, when a group is added, it is required to provide two dual cells having different directions respectively between the new group and the other groups, which results in an increase in cost.

Figure 25:
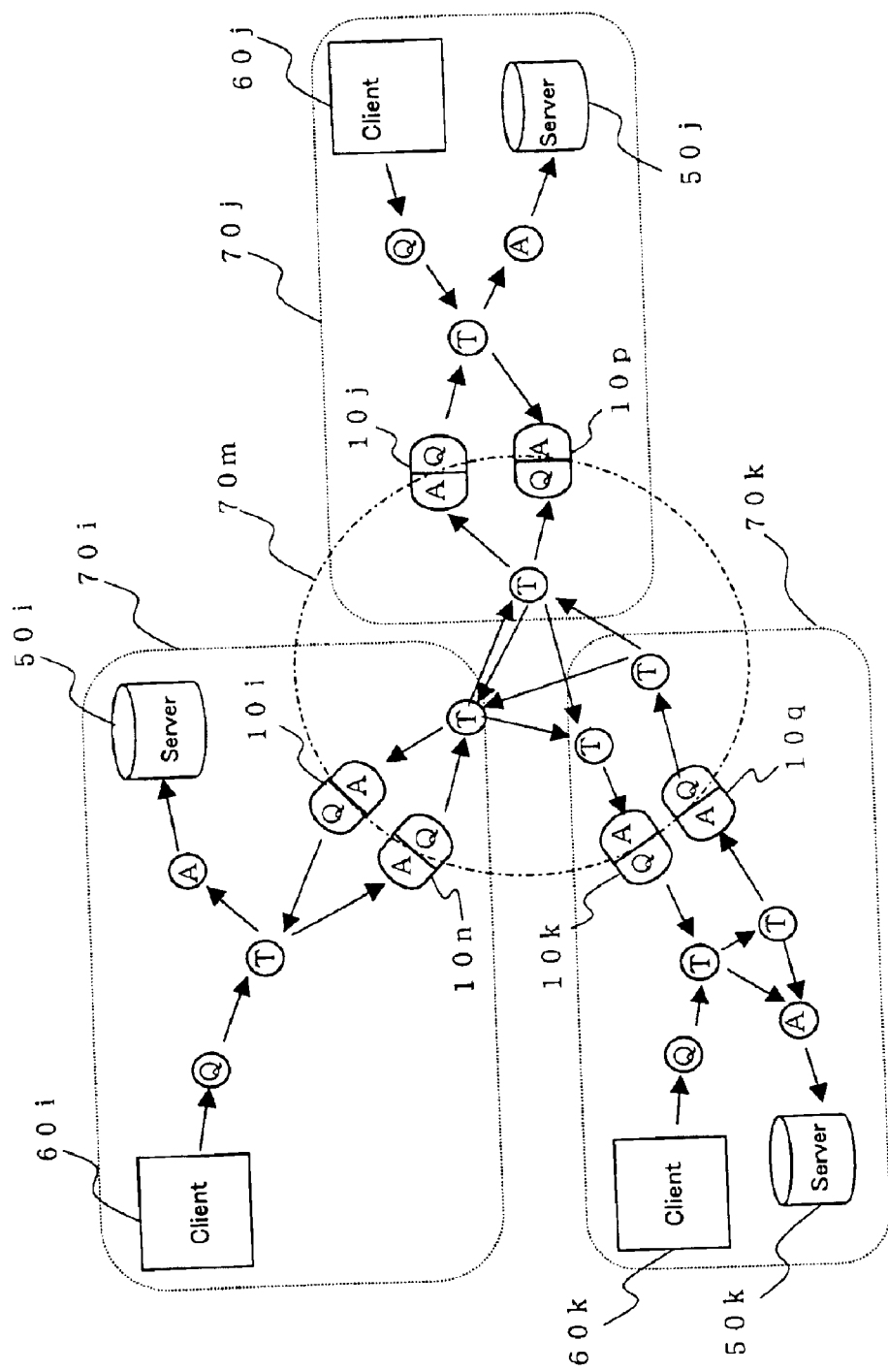
FIG. 25 is a schematic diagram showing an entire configuration of a facilitator having a distributed configuration of Embodiment 5 according to the present invention.

The second connection system is that a group for connection among groups is newly provided. The outline of the entire configuration of the facilitator, in which a group for connection among groups is newly provided, will be described with reference to the drawings. FIG. 25 is a schematic diagram showing the entire configuration of the facilitator having a distributed configuration in which a group for connection among groups is newly provided. In FIG. 25, the same elements as those in FIG. 1 are denoted by the same reference numerals as those therein, and the description of the same operation as that in Embodiment 1 will be omitted.

In an example shown in FIG. 25, a user 60$i$, a server 50$i$, a dual cell 10$i$, and a dual cell 10$n$ belong to a group 70$i$; a user 60$j$, a server 50$j$, a dual cell 10$j$, and a dual cell 10$p$ belong to a group 70$j$; and a user 60$k$, a server 50$k$, a dual cell 10$k$, and a dual cell 10$q$ belong to a group 70$k$. Furthermore, as a group 70$m$, a group for connection among groups (herein, referred to as a "hub group") is provided at the center. The hub group 70$m$ includes, on the border, all the dual cells 10$k$ to 10$q$ of the respective groups 70$i$ to 70$k$, and transfer cells 30$i$ to 30$k$ are provided at the center for connecting dual cells to each other.

On the respective borders between the hub group 70$m$ and the groups 70$i$ to 70$k$, a pair of dual cells are provided in parallel in different directions. Therefore, as described in Embodiment 4, the hub group 70$m$ and the respective groups 70$i$ to 70$k$ have a portion functioning as the query cell 20 and a portion functioning as the answer cell 40, whereby bidirectional communication is made possible among groups.

As described above, each group only needs to be connected to the hub group 70$m$ via dual cells 10$k$ to 10$q$, and is not required to be directly connected to the other groups individually. Therefore, in the case where the number of groups is N, the number of connections among groups becomes N. A new group is added or an existing group is deleted merely by connection or disconnection with respect to the hub group, so that a connection and management cost becomes small.

Embodiment 6

A facilitator having a distributed configuration of Embodiment 6 is provided with a cell (referred to as an integrated cell) having all the functions of a query cell 20, a transfer cell 30, an answer cell 40, a dual cell 10, and a centralized facilitator.

First, an integrated cell will be described.

Figure 26:
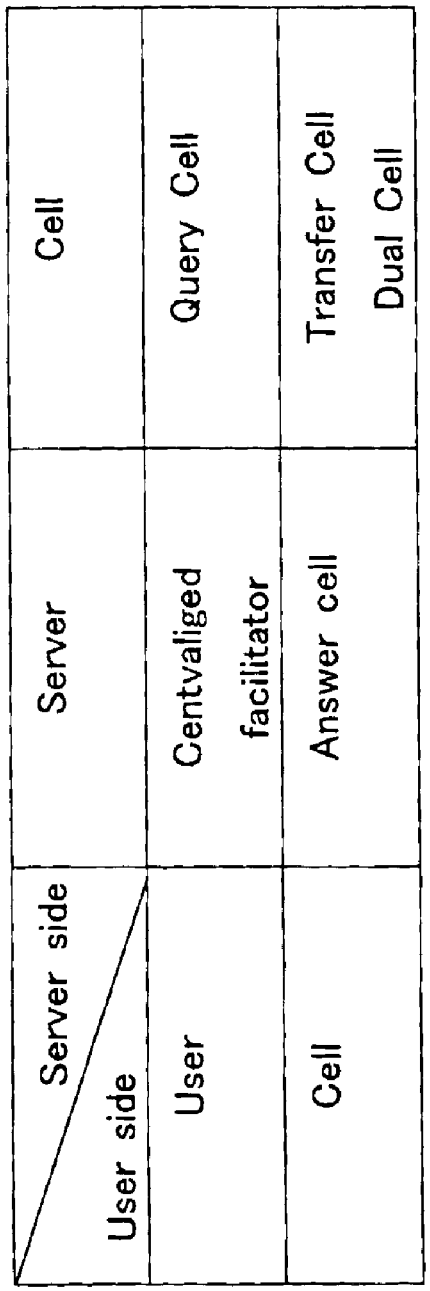
FIG. 26 is a classification diagram showing classification of respective cells of the present invention based on input/output.

In the description of the facilitator having a distributed configuration of the present invention, the query cell 20, the transfer cell 30, the answer cell 40, and the dual cell 10 have been described. FIG. 26 shows the classification of these cells based on input/output. More specifically, cells are classified based on whether a connection partner of a cell of interest on the user side is a non-cell (user) or a cell, and whether a connection partner on the server side is a non-cell (server) or a cell. FIG. 26 shows the classification results. As shown in FIG. 26, if a connection partner on the user side and a connection partner on the server side are both non-cells, the centralized facilitator is used, and if a connection partner on the user side and a connection partner on the server side are both cells, the transfer cell 30 or the dual cell 10 are used. Herein, a cell corresponding to a non-cell (user) and a cell as an entity on the user side and corresponding to a non-cell (server) and a cell as an entity on the server side can be considered. Such a cell can correspond to all the sections in FIG. 26, and has all the functions of the query cell 20, the transfer cell 30, the answer cell 40, the dual cell 10, and the centralized facilitator. Such a cell is the above-mentioned integrated cell. The integrated cell selects its operation mode based on the contents of an input request, the contents of an answer, and the setting of the integrated cell. More specifically, the integrated cell dynamically selects whether it is operated as the dual cell 10 or as the transfer cell 30, based on the relationship of input/output.

The behavior (operation mode) of the integrated cell is basically determined based on an input/output subject. In the case of direct input from a user and output to another cell, the integrated cell is operated as a query cell. In the case of direct input from the user 60 and output to the server 50, the integrated cell is operated in the same way as in the centralized facilitator. In the case of input from another cell and output to a server, the integrated cell is operated as an answer cell.

Herein, in the case of input from another cell and output to another cell, the integrated cell may behave as the transfer cell 30 or as the dual cell 10. There are some methods for determining whether the integrated cell is operated in an operation mode of the transfer cell 30 or the dual cell 10 as described below.

According to the first determination method, the manger of the integrated cell selects an operation mode if required. In this case, it is preferable that operation mode selecting means is provided for the manager of the integrated cell to select an operation mode.

According to the second determination method, an operation mode is altered depending upon the user. For example, if a group including a user having made a request is previously ranked as a group with low reliability in terms of management of security, the operation mode of the integrated cell is automatically altered to a dual cell operation mode with respect to a request from a user belonging to the group, and the integrated cell can behave as a connecting point for communication among groups to conceal the configuration on the server side. Furthermore, the operation mode of the integrated cell is automatically altered to that of a transfer cell with respect to a request from a user belonging to a group with high reliability in terms of management of security. According to this determination method, the operation mode can be automatically altered in accordance with the reliability of a user, and the security of the facilitator can be ensured.

According to the third determination method, an operation mode is dynamically altered depending upon the number of transfer target cells. A server selection request and a server operation request may be made by a user separately. In this case, the server selection request passes through the transfer cell, whereas the server operation request is directly sent to the answer cell 40 from the query cell 20 without passing through the transfer cell 30. Furthermore, answers from the selected servers 50 are collected at the query cell 20; therefore, in the case where the number of selected servers is large, a load is concentrated on the query cell 20. If the integrated cell is operated as a dual cell in the case where it is expected that a load is concentrated on the query cell 20, distribution of a load of the query cell 20 can be prevented. More specifically, the integrated cell is disposed at a portion where the transfer cell 30 is to be placed usually; in processing of the server selection request, in the case where the number of selected servers is less than a predetermined number, the operation mode of the integrated cell is automatically switched to that of the transfer cell, and in the case where the number of servers is equal to or greater than a predetermined number, the operation mode of the integrated cell is automatically switched to that of the dual cell. In this case, the server operation request with respect to the group including the integrated cell is sent to the integrated cell, the integrated cell organizes answers from the servers, and thereafter, the answers are transferred to the query cell, which can prevent the concentration of a load on the query cell 20.

By including the integrated cell having the above-mentioned functions in cells of a facilitator having a distributed configuration, the use of the facilitator becomes further flexible.

Next, a module configuration of the integrated cell will be described.

Figure 27:
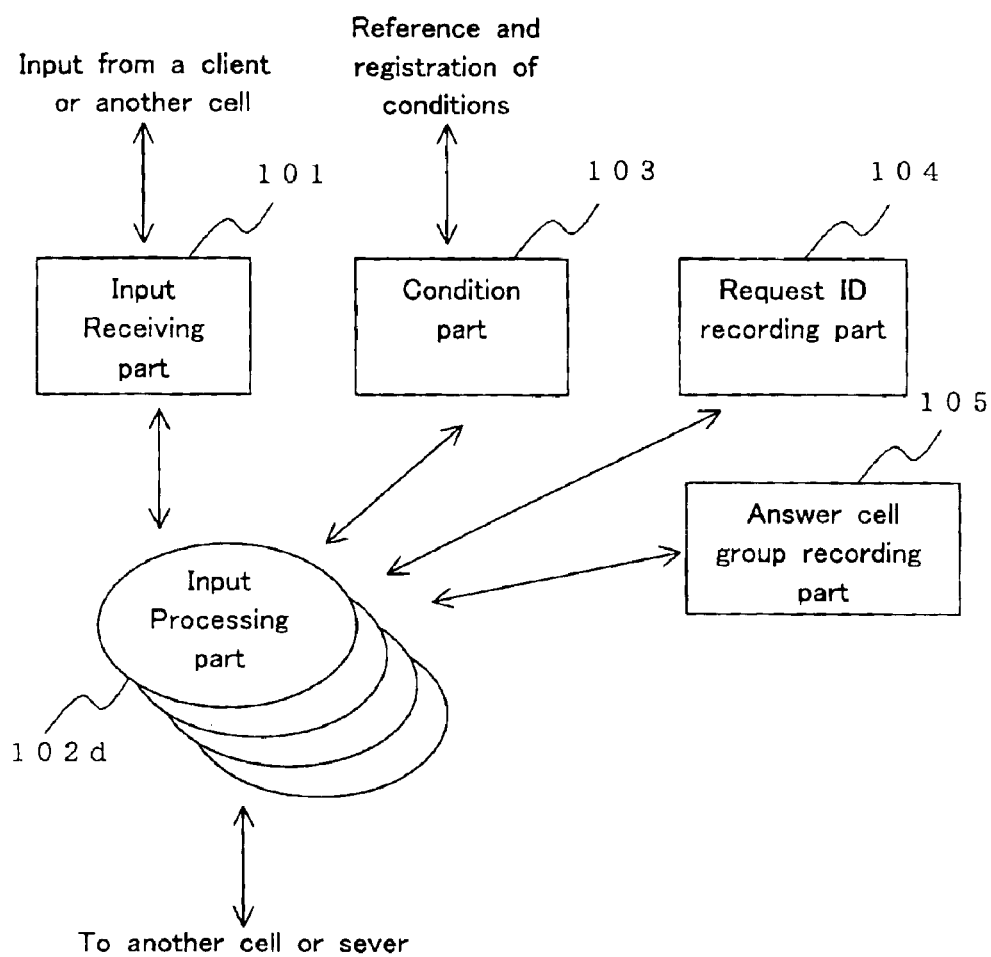
FIG. 27 shows an exemplary module configuration of an integrated cell of the facilitator according to the present invention.
Figure 28:
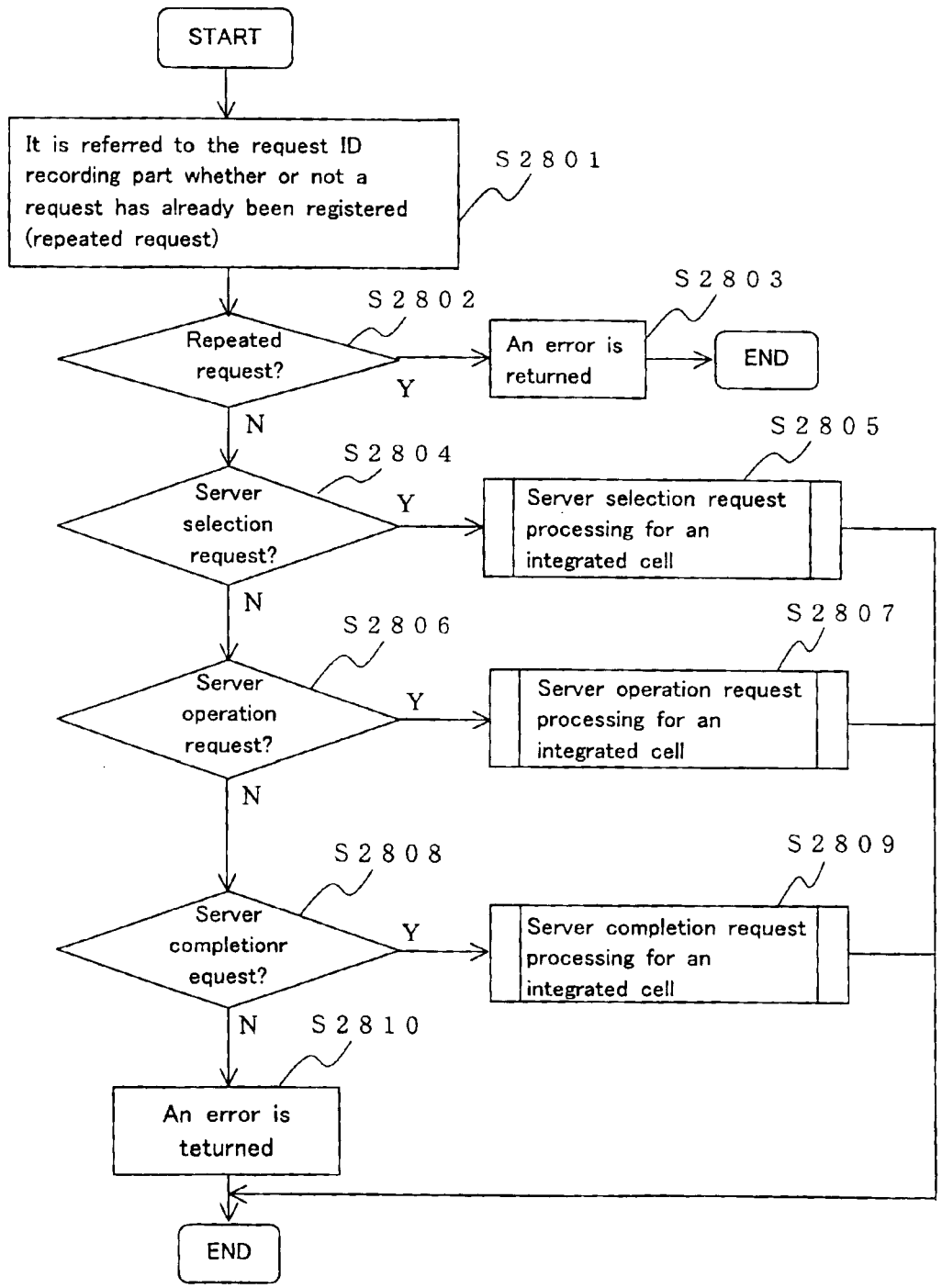
FIG. 28 is a flow chart showing, as processing steps, exemplary processing contents of an input processing part 102d of the integrated cell of the facilitator according to the present invention.

FIG. 27 shows an exemplary module configuration of the integrated cell. The integrated cell is also configured by a plurality of internal processes, and includes an input receiving part 101, an input processing part 102*d*, a condition part 103, a request ID recording part 104, and an answer cell group recording part 105. Each part is the same process as that of the query cell 20, denoted by the same reference numeral. The description thereof will be omitted here. The input processing part 102*d* is also a process that is generated every time the input receiving part 101 receives input from an outside in the same way as in the input processing part 102 of the query cell. However, in the input processing part 102*d* of the integrated cell, as shown in FIG. 28, three kinds of input requests: a server selection request, a server operation request, and a server completion request are processed. It is referred to the request ID recording part 105 whether or not an input request has already been processed (Step S2801). In the case where the input request is not a repeated request (Step S2802: N), and is a selection request of the server (Step S2804: Y), a server selection request processing routine for the integrated cell is conducted (Step S2805). In the case where the input request is a server operation request (Step S2806: Y), a server operation request processing routine is conducted (Step S2807), and a server is actually accessed. In the case where the input request is a server completion request (Step 2808: Y), a server completion request processing routine for the integrated cell is conducted (Step S2809). Examples of the above-mentioned server selection request processing routine for the integrated cell, server operation request processing routine for the integrated cell, and server completion request processing routine for the integrated cell are described below.

Figure 29:
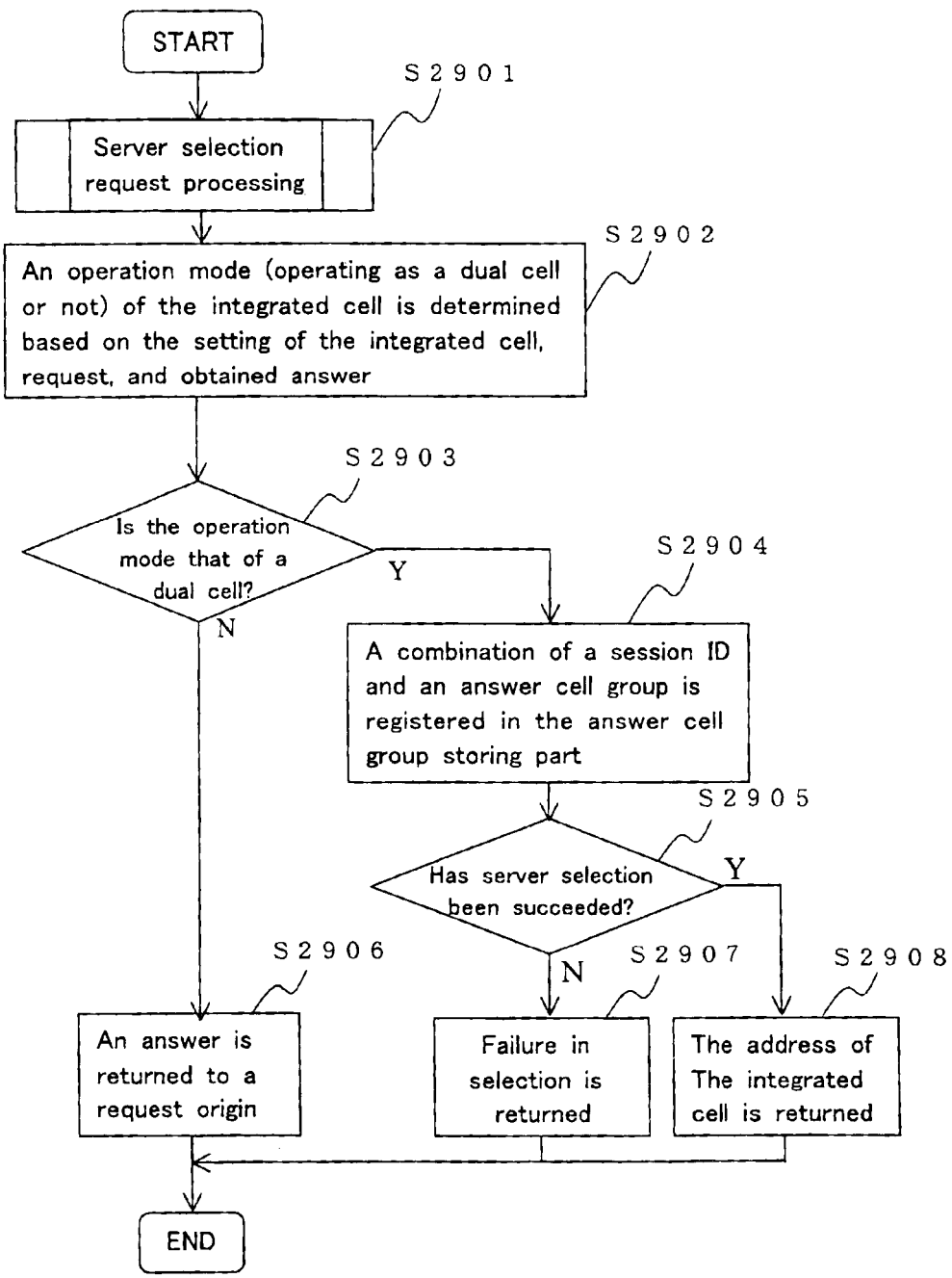
FIG. 29 is a flow chart showing, as processing steps, an exemplary server selection request processing routine for the integrated cell of the facilitator according to the present invention.

FIG. 29 shows an exemplary server selection request processing routine for the integrated cell. According to the server selection request processing routine for the integrated cell, a server selection request processing routine described in the query cell is invoked (Step S2901). Thereafter, an operation mode of the integrated cell is determined based on the contents of an input request, the contents of an answer, and the setting of the integrated cell (Step S2902). In the case where the operation mode is a dual cell (Step 2903: Y), in the same way as in the dual cell, a combination of an answer set group and a session ID obtained from the usual server selection request processing routine in Step S2901 is stored in the answer cell group recording part 105 (Step S2904). Then, the address of the integrated cell is returned (Step S2908). Because of the addition of Steps S2904 to S2908, the integrated cell functions in the same way as in the dual cell, and the answer cell group on the server side is concealed from the query cell. In the case where the operation mode is not a dual cell (Step S2903: N), in the same way as in the transfer cell 30, an answer from the usual server selection processing routine is directly transferred to the request origin (Step S2906). An exemplary processing operation of the server selection processing routine for the integrated cell has been described as above.

Figure 30:
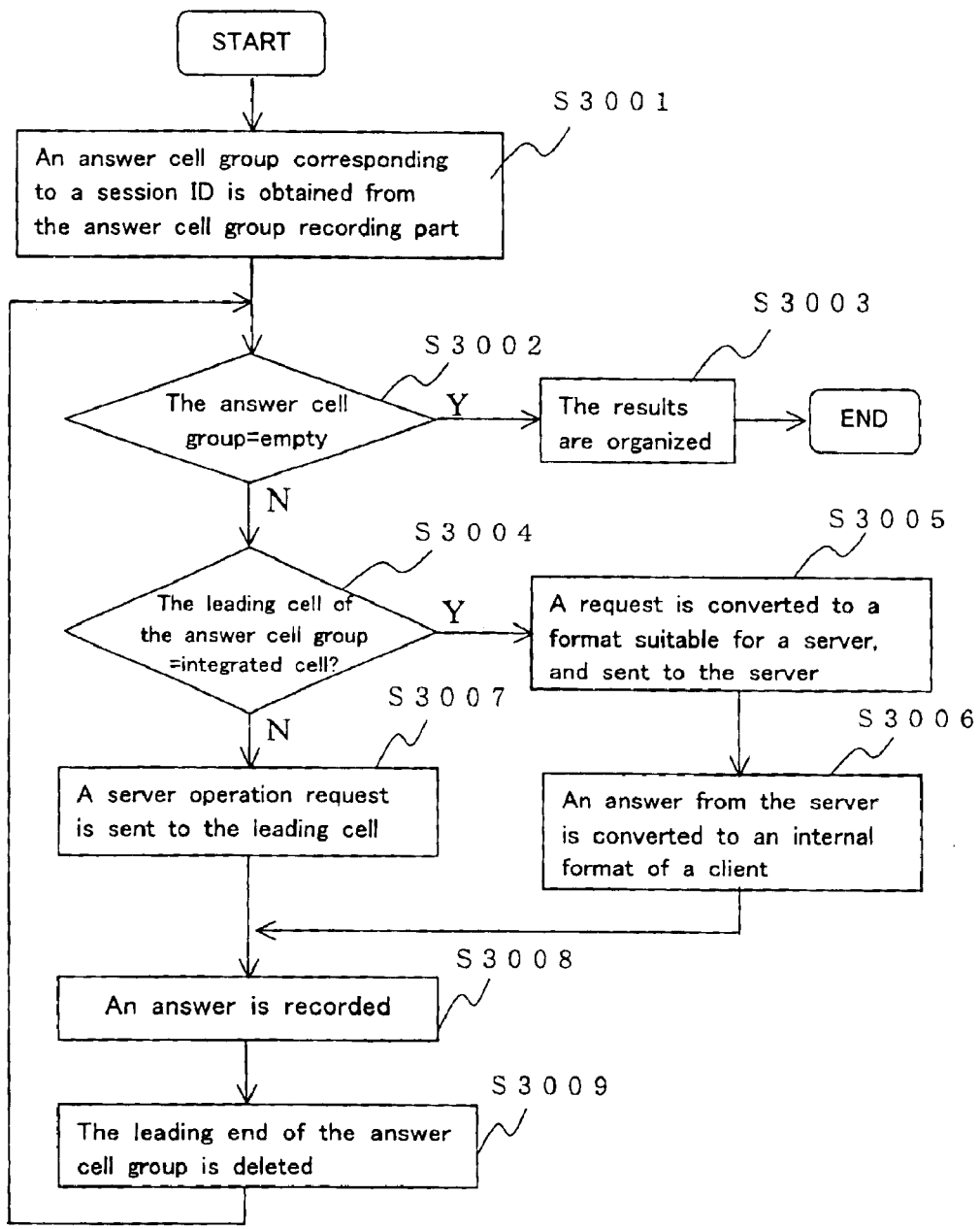
FIG. 30 is a flow chart showing, as processing steps, an exemplary server operation request processing routine for the integrated cell of the facilitator according to the present invention.

Next, FIG. 30 shows an exemplary server operation request processing routine for the integrated cell. According to the server operation request processing routine for the integrated cell, a list of the selected answer cell group is obtained from the answer cell group recording part 105, using a session ID attached to the input server operation request as a key (Step S3001). In the case where the integrated cell directly knows the server 50, the address of the integrated cell may be contained in the list. In the case where the cell at the leading end of the list is the integrated cell (Step S3004: Y), the corresponding server is accessed (Step S3005), and the obtained answer is converted to an appropriate internal format to be recorded (Step S3006). In the case where the cell at the leading end of the answer cell group is not the integrated cell (Step S3004: N), a server operation request is transferred to the leading cell (Step S3007), and the obtained answer is recorded (Step S3008). The cell at the leading end of the list of the answer cell group is deleted (Step S3009). Steps S3002 to S3009 are repeated to conduct the processing with respect to all the elements in the list (Step S3002: Y), and the results are organized to be returned to the request origin (Step S3003). An exemplary processing operation of the server operation request processing routine for the integrated cell has been described above.

Figure 31:
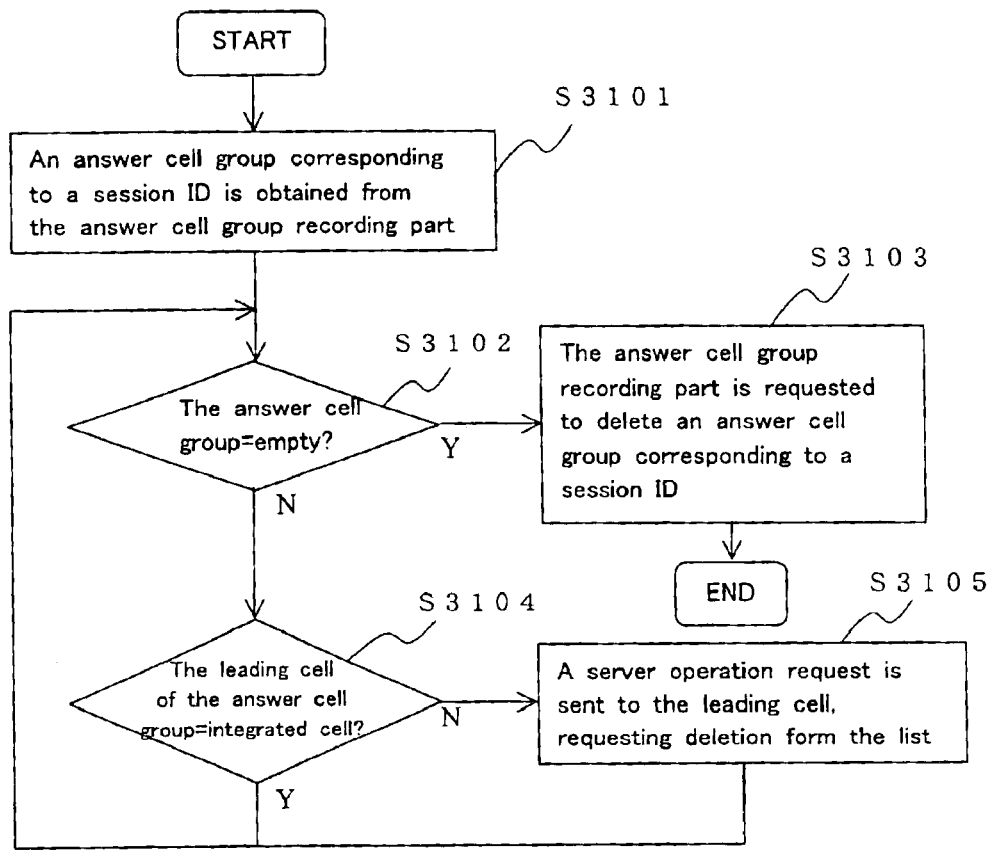
FIG. 31 is a flow chart showing, as processing steps, an exemplary server completion request processing routine for the integrated cell of the facilitator according to the present invention.
Figure 32:
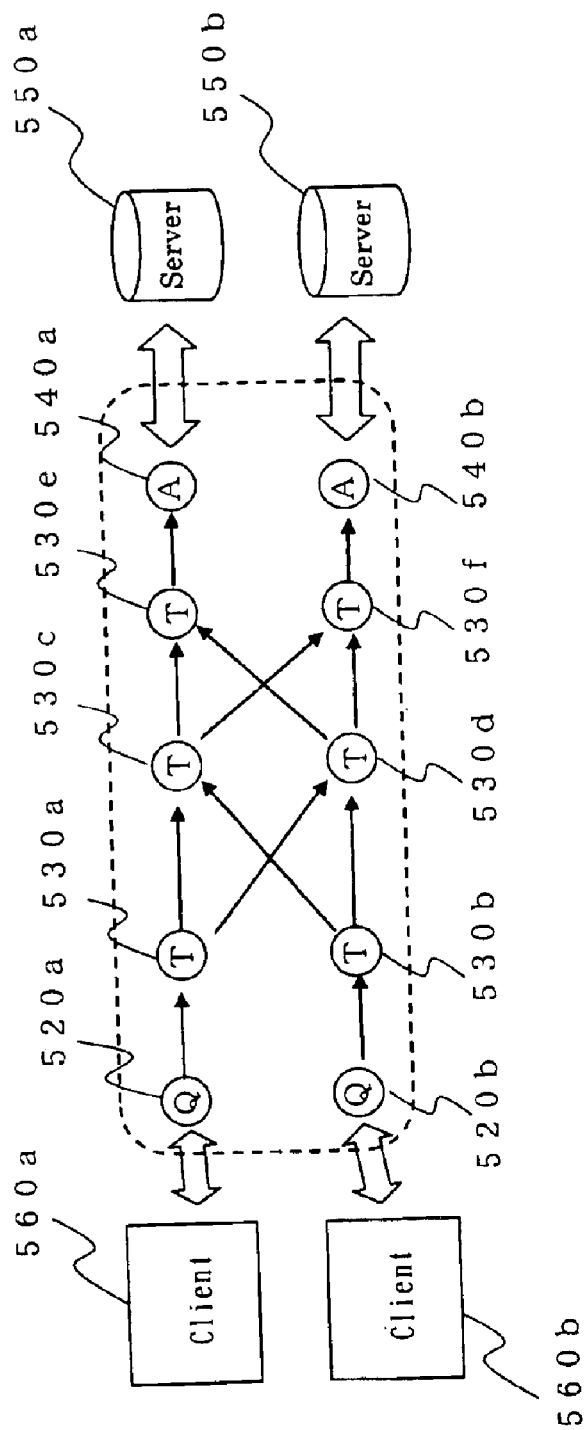
FIG. 32 is a diagram illustrating a concept of a facilitator having a conventional distributed configuration.

Next, FIG. 31 shows an exemplary server completion request processing routine for the integrated cell. According to the server completion request processing routine for the integrated cell, first, a list of the selected answer cell group is obtained from the answer cell group recording part 105, using a session ID attached to the server completion request as a key (Step S3101). In the same way as in the server operation request processing routine for the integrated cell, it is checked whether or not a cell at the leading end is the integrated cell. In the case where the cell at the leading end is not the integrated cell (Step S3104: N), a server completion request is sent to the leading end of the list, thereby requesting that the leading end of the list of the answer cell group is deleted (Step S3105). After the server completion request transfer processing is conducted with respect to all the elements in the list, in the case where the list of the answer cell group becomes empty (Step S3102: Y), the answer cell group recording part 105 of the integrated cell is instructed to delete the answer cell group corresponding to the session ID (Step S3103). An exemplary processing operation of the server completion request processing routine for the integrated cell has been described above.

Each constituent part of the exemplary module configuration of the integrated cell of the present invention shown in FIG. 27 has been described.

By including the integrated cell having the above-mentioned functions in cells of the facilitator having a distributed configuration, the use of the facilitator having a distributed configuration of the present invention is made flexible.

INDUSTRIAL APPLICABILITY

According to the facilitator having a distributed configuration of the present invention, by including a dual cell in cells of the facilitator having a distributed configuration, the dual cell controls communication between groups, a user, a server, a query cell, an answer cell, and a transfer cell respectively communicate with the dual cell apparently, so that security can be enhanced compared with the case where each element cell of the facilitator has a flat configuration.

Furthermore, according to the facilitator having a distributed configuration of the present invention, by including a dual cell in cells of the facilitator having a distributed configuration, even in the case where alterations such as addition and deletion of a user and a server are conducted, and the address of each cell is changed, the setting of the dual cell only needs to be altered, whereby the flexibility and maintenance of the system are enhanced.

Furthermore, according to the facilitator having a distributed configuration of the present invention, even in the case where a firewall is present, a dual cell is provided on the firewall, whereby a facilitator can be configured on the network including the firewall.

According to the facilitator having a distributed configuration of the present invention, a dual cell allows the contents of a query and an answer to be easily stored and managed, and a cost and a processing time can be reduced in a system based on a wide area network. Furthermore, the contents of input and output can be converted in the dual cell, so that a user name and the contents of a query and an answer can be converted.

Furthermore, by operating a plurality of dual cells (if required) in parallel, the load of the entire facilitator can be distributed.

Furthermore, according to the facilitator having a distributed configuration of the present invention, by including an integrated cell in cells of the facilitator having a distributed configuration, the use of the facilitator is made further flexible.

What is claimed is:

1. A facilitator having a distributed configuration comprising cell apparatuses for conducting distributed processes, disposed between a server apparatus and a client apparatus connected through a computer network, for facilitating the server apparatus and the client apparatus so that they are concealed from each other, wherein:

at least one of the cell apparatuses of the facilitator is a dual cell apparatus that functions as a query cell apparatus for conducting a process of behaving as a querier making a request and as an answer cell apparatus for conducting a process of behaving as an answerer giving an answer to the request;

the dual cell apparatus has functions of two cells for behaving as a query cell apparatus with respect to the server apparatus to transfer contents of a request from a querier to the server apparatus and for behaving as an answer cell apparatus to the request with respect to the client apparatus to transfer an answer from the server apparatus to the client apparatus; and the cell apparatuses of the facilitator are classified on a group basis to form a plurality of groups, the dual cell apparatus is disposed on a border between the groups, and communication between the groups is conducted through the dual cell apparatus.

2. A facilitator having a distributed configuration according to claim 1, wherein the network includes a firewall, the server apparatus and the client apparatus are disposed across entities partitioned by the firewall, the dual cell apparatus is provided on the firewall, and the facilitator is configured across the firewall.

3. A facilitator having a distributed configuration according to claim 1, wherein, as a channel forming a data path, a plurality of dual cell apparatuses are provided in parallel, whereby the plurality of channels, each forming the data path, are provided.

4. A facilitator having a distributed configuration according to claim 1, wherein the dual cell apparatus includes a temporary storing part for temporarily storing query contents and answer contents transmitted via the dual cell apparatus, and has a cache function of, in a case where the same query contents are repeated, omitting transmission of the query contents and providing answer contents corresponding to query contents stored in the temporary storing part.

5. A facilitator having a distributed configuration according to claim 1, wherein the dual cell apparatus includes an information rewriting part for rewriting information contents passing through the dual cell apparatus to send them, and the rewriting part holds information for converting an information format of one of the apparatuses communicating through the dual cell apparatus to an information format of the other apparatus, and converts an information format of input from the one apparatus communicating through the dual cell apparatus to an information format of the other apparatus to send it to the other apparatus.

6. A facilitator having a distributed configuration according to claim 1, wherein two dual cell apparatuses are disposed as a pair on a border between the groups of the cell apparatuses so that a transfer direction as the querier is opposite to a transfer direction as the answerer, whereby bidirectional communication between the groups of the cell apparatuses is made possible.

7. A facilitator having a distributed configuration according to claim 1, comprising at least three groups and a hub group for connection among the groups, wherein the hub group is connected to the respective groups via dual cell apparatuses, and all the dual cell apparatuses in the hub group are interconnected.

* * * * *